(12) United States Patent
Potts et al.

(10) Patent No.: US 6,593,956 B1
(45) Date of Patent: Jul. 15, 2003

(54) LOCATING AN AUDIO SOURCE

(75) Inventors: Steven L. Potts, Andover, MA (US); Hong Wang, Westford, MA (US); Wendi Beth Rabiner, Boston, MA (US); Peter L. Chu, Lexington, MA (US)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 09/079,840

(22) Filed: May 15, 1998

(51) Int. Cl.[7] .......................... H04N 7/14; H04N 5/225; G10L 17/00; H04M 3/42
(52) U.S. Cl. ............... 348/14.09; 348/169; 379/205.01; 704/246
(58) Field of Search ........................... 348/14.1, 15, 16, 348/21, 13, 169, 203, 20, 36, 14.08, 14.09; 381/92, 2; 379/206.01, 202, 205.01; 382/118, 173, 291, 239, 103; 704/246, 218, 270; H04N 7/14

(56) References Cited

U.S. PATENT DOCUMENTS 4,264,928 A * 4/1981 Schober ........................ 348/15

(List continued on next page.)

FOREIGN PATENT DOCUMENTS

| EP | 0 356 105 | 2/1990 | ............. H04N/7/15 |
| EP | 0 635 983 | 1/1995 | ............. H04N/7/24 |
| EP | 0 836 326 | 4/1998 | ............. H04N/7/24 |
| WO | 94 17636 | 8/1994 | ............. H04N/7/18 |

OTHER PUBLICATIONS

Vahedian et al, "Estimation of Speaker Position Using Audio Information", vol. 1, Dec. 2, 1997; pp. 181–184.
Wang et al., "A Hybrid Real–Time Face Tracking System", ICASSP '98 Proceedings, IEEE International Conference on Acoustics, Speech, and Signal Processing, vol. 6 of 6: Communications Audio . . . (1998).

*Primary Examiner*—Gims S. Philippe
(74) *Attorney, Agent, or Firm*—Wong, Cabello, Lutsch, Rutherford & Brucculeri, L.L.P.

(57) ABSTRACT

A system, such as a video conferencing system, is provided which includes an image pickup device, an audio pickup device, and an audio source locator. The image pickup device generates image signals representative of an image, while the audio pickup device generates audio signals representative of sound from an audio source, such as speaking person. The audio source locator processes the image signals and audio signals to determine a direction of the audio source relative to a reference point. The system can further determine a location of the audio source relative to the reference point. The reference point can be a camera. The system can use the direction or location information to frame a proper camera shot which would include the audio source.

64 Claims, 23 Drawing Sheets

U.S. PATENT DOCUMENTS

| | | | | |
|---|---|---|---|---|
| 4,400,724 A | * | 8/1983 | Fields | 348/15 |
| 4,494,144 A | * | 1/1985 | Brown | 348/420 |
| 4,961,211 A | * | 10/1990 | Tsugane et al. | 348/15 |
| 4,965,819 A | * | 10/1990 | Kannes | 348/15 |
| 4,975,960 A | | 12/1990 | Petajan | 381/43 |
| 5,012,522 A | | 4/1991 | Lambert | 382/2 |
| 5,034,986 A | | 7/1991 | Karmann et al. | 382/1 |
| 5,206,721 A | * | 4/1993 | Ashida et al. | 348/15 |
| 5,280,530 A | | 1/1994 | Trew et al. | 382/1 |
| 5,323,470 A | | 6/1994 | Kara et al. | 382/1 |
| 5,335,011 A | * | 8/1994 | Addeo et al. | 348/15 |
| 5,340,309 A | | 8/1994 | Robertson | 433/69 |
| 5,347,306 A | | 9/1994 | Nitta | 348/15 |
| 5,355,163 A | | 10/1994 | Tomitaka | 348/234 |
| 5,416,513 A | | 5/1995 | Morisaki | |
| 5,430,809 A | | 7/1995 | Tomitaka | 382/173 |
| 5,432,864 A | | 7/1995 | Lu et al. | 382/118 |
| 5,473,369 A | | 12/1995 | Abe | 348/169 |
| 5,497,430 A | | 3/1996 | Sadovnik et al. | 382/156 |
| 5,500,671 A | | 3/1996 | Andersson et al. | 348/15 |
| 5,512,939 A | | 4/1996 | Zhou | 348/17 |
| 5,546,125 A | | 8/1996 | Tomitaka et al. | 348/169 |
| 5,550,754 A | * | 8/1996 | McNelley et al. | 348/15 |
| 5,550,928 A | | 8/1996 | Lu et al. | 382/116 |
| 5,552,823 A | | 9/1996 | Kageyama | 348/155 |
| 5,561,718 A | | 10/1996 | Trew et al. | 382/118 |
| 5,574,498 A | | 11/1996 | Sakamoto et al. | 348/169 |
| 5,631,697 A | | 5/1997 | Nishimura et al. | 348/172 |
| 5,686,957 A | * | 11/1997 | Baker | 348/15 |
| 5,715,325 A | | 2/1998 | Bang et al. | 382/118 |
| 5,742,329 A | * | 4/1998 | Masunaga et al. | 348/15 |
| 5,778,082 A | * | 7/1998 | Chu et al. | 348/15 |
| 5,852,669 A | * | 12/1998 | Eleftheriadis et al. | 382/118 |
| 5,940,118 A | * | 8/1999 | Van Schyndel | 348/14 |
| 6,188,777 B1 | * | 2/2001 | Darrell et al. | 382/103 |

* cited by examiner

|       |                                    |
|-------|------------------------------------|
| $b(i,j)$ | BINARIZED IMAGE VALUE AT LOCATION i,j |
| $C_h(i,j)$ | PIXEL CHROMA AT LOCATION i,j |
| $C_r(i,j)$ | PIXEL CHROMA AT LOCATION i,j |
| 605 | FOR ALL PIXELS i,j { |
| 610 |     IF $(-50 < C_h(i,j) < -5) \cap (7 < C_r(i,j) < 60)$ |
| 615 |         $b(i,j) = 1$: |
| 620 |     ELSE |
| 625 |         $b(i,j) = 0$: |
|     | } |

|       |                                              |
|-------|----------------------------------------------|
| $b(i,j)$ | BINARIZED IMAGE VALUE AT LOCATION i,j |
| $Y_0(i,j)$ | CURRENT FRAME PIXEL LUMA AT LOCATION i,j |
| $Y_{-1}(i,j)$ | PREVIOUS FRAME PIXEL LUMA AT LOCATION i,j |
| 705 | FOR ALL PIXELS i,j { |
| 710 |     IF $b(i,j) = 1$ |
| 715 |         IF $|Y_0(i,j) - Y_{-1}(i,j)| \leq 5$ |
| 720 |             $b(i,j) = 0$; |
|     | } |

$Y_0(i,j)$    LUMA PIXEL AT LOCATION i,j FOR CURRENT FRAME $Y_{-1}(i,j)$    LUMA PIXEL AT LOCATION i,j FOR PREVIOUS FRAME $i(n), j(n)$    HORIZONTAL AND VERTICAL INDEX RANGES FOR BOX n $s(n)$    SIZE (PIXEL COUNT) FOR BOX n $v_t(n)$    TEMPORAL LUMA DIFFERENCE VARIANCE BOX n $m_t(n)$    TEMPORAL LUMA DIFFERENCE MEAN IN BOX n $v_s(n)$    SPATIAL LUMA VARIANCE IN BOX n $m_s(n)$    SPATIAL LUMA MEAN IN BOX n $T_t, T_s$    TEMPORAL AND SPATIAL THRESHOLDS    800

805    FOR ALL BOXES n {

810    $m_t(n) = \frac{1}{s(n)} \sum_{i=i(n)} \sum_{j=j(n)} (Y_0(i,j) - Y_{-1}(i,j));$ 815    $v_t(n) = \frac{1}{s(n)} \sum_{i=i(n)} \sum_{j=j(n)} [(Y_0(i,j) - Y_{-1}(i,j)) - m_t(n)]^2;$ 820    IF $v_t(n) < T_t$ 825       REMOVE BOX [n] FROM LIST;

830    $m_s(n) = \frac{1}{s(n)} \sum_{i=i(n)} \sum_{j=j(n)} (Y_0(i,j);$

835    $v_s(n) = \frac{1}{s(n)} \sum_{i=i(n)} \sum_{j=j(n)} [Y_0(i,j) - m_s(n)]^2;$ 840    IF $v_s(n) < T_s$ 845       REMOVE BOX [n] FROM LIST;

$x_i(n)$    TRACK FILE i HORIZONTAL VIDEO FRAME PIXEL LOCATION ESTIMATE AT FRAME n
$\hat{x}_i(n)$    TRACK FILE i HORIZONTAL VIDEO FRAME PREDICTED LOCATION ESTIMATE AT FRAME n
$\dot{x}_i(n)$    TRACK FILE i HORIZONTAL VIDEO FRAME PIXEL MOTION ESTIMATE AT FRAME n (PIXELS PER FRAME)
$\hat{\dot{x}}_i(n)$    TRACK FILE i HORIZONTAL VIDEO FRAME PREDICTED MOTION ESTIMATE AT FRAME n (PIXELS PER FRAME)
$y_i(n)$    TRACK FILE i VERTICAL VIDEO FRAME PIXEL LOCATION ESTIMATE AT FRAME n
$\hat{y}_i(n)$    TRACK FILE i VERTICAL VIDEO FRAME PREDICTED LOCATION ESTIMATE AT FRAME n
$\dot{y}_i(n)$    TRACK FILE i VERTICAL VIDEO FRAME PIXEL MOTION ESTIMATE AT FRAME n (PIXELS PER FRAME)
$\hat{\dot{y}}_i(n)$    TRACK FILE i VERTICAL VIDEO FRAME PREDICTED MOTION ESTIMATE AT FRAME n (PIXELS PER FRAME)
$c_i(n)$    TRACK FILE i CONFIDENCE AT FRAME n $g_{md}$    MOTION PREDICTION DECAY < 1.0
$g_{cd}$    CONFIDENCE PREDICTION DECAY < 1.0

1005    FOR ALL TRACK FILES i {
1010    $\hat{x}_i(n) = x_i(n-1) + \dot{x}_i(n-1)$
1015    $\hat{\dot{x}}_i(n) = g_{md}\dot{x}_i(n-1)$
1020    $\hat{y}_i(n) = y_i(n-1) + \dot{y}_i(n-1)$
1025    $\hat{\dot{y}}_i(n) = g_{md}\dot{y}_i(n-1)$
1030    $\hat{c}_i(n) = g_{cd}c_i(n-1)$
   }

FIG. 10

$s_{xi}(n)$ TRACK FILE i HORIZONTAL PIXEL SEARCH RANGE AT FRAME n $(S_{xi}(n) = 3\sqrt{\sigma_{xx}^2 - \sigma_{xm}^2})$
$s_{yi}(n)$ TRACK FILE i HORIZONTAL PIXEL SEARCH RANGE AT FRAME n $(S_{yi}(n) = 3\sqrt{\sigma_{yy}^2 - \sigma_{ym}^2})$
$\sigma_{xx}^2$ HORIZONTAL POSITION STATE VARIANCE
$\sigma_{yy}^2$ VERTICAL POSITION STATE VARIANCE
$\sigma_{xm}^2$ HORIZONTAL MEASUREMENT VARIANCE
$\sigma_{ym}^2$ VERTICAL MEASUREMENT VARIANCE
$x_{mj}(n)$ MEASUREMENT j HORIZONTAL VIDEO FRAME PIXEL LOCATION AT FRAME n
$y_{mj}(n)$ MEASUREMENT j VERTICAL VIDEO FRAME PIXEL LOCATION AT FRAME n
$x_{sj}(n)$ MEASUREMENT j HORIZONTAL VIDEO FRAME OBJECT SIZE AT FRAME n
$y_{sj}(n)$ MEASUREMENT j VERTICAL VIDEO FRAME OBJECT SIZE AT FRAME n

```
1105   FOR (ORDERED TRACK FILES i) {                                    1100
1107       IF (Track_File[i].status.tinit == TRUE) {
1110           FOR (UNMATCHED MEASUREMENTS j) {
1112               IF ( ( |x̂_i (n) − x_jm (n)| < s_xi )∩ ( |ŷ_i (n) − ŷ_jm (n)| < s_yi ) ) {
1113                   MARK MEASUREMENT j AS CANDIDATE FOR FILE i; } }

1117           IF (CANDIDATES j EXIST) {
1120               FOR (CANDIDATES j OF FILE i) {
1122                   d_ij = √((x̂_i (n) − x_jm (n))² + (ŷ_i (n) − y_jm (n))²)    }
1125               FIND MINIMUM d_ij;
1127               MARK MEASUREMENT j ASSOCIATED TO FILE i ;
1130               Track_File [i] .status.tmeas = TRUE;
1132               Track_File [i] .noupdate_count = 0;
1135               Track_File [i] .x_meas = x_jm (n);
1137               Track_File [i] .y_meas = y_jm (n);
1140               Track_File [i] .x_size_meas = x_sj (n);
1142               Track_File [i] .y_size_meas = y_sj (n); }
1145           ELSE {
1147               Track_File [i] .status.tmeas = FALSE;
1150               Track_File [i] .noupdate_count += 1; } } }
```

FIG. 11

$x_i(n)$ TRACK FILE i HORIZONTAL VIDEO FRAME PIXEL LOCATION ESTIMATE AT FRAME n
$\hat{x}_i(n)$ TRACK FILE i HORIZONTAL VIDEO FRAME PREDICTED LOCATION ESTIMATE AT FRAME n
$\dot{x}_i(n)$ TRACK FILE i HORIZONTAL VIDEO FRAME PIXEL MOTION ESTIMATE AT FRAME n (PIXELS PER FRAME)
$\hat{\dot{x}}_i(n)$ TRACK FILE i HORIZONTAL VIDEO FRAME PREDICTED MOTION ESTIMATE AT FRAME n (PIXELS PER FRAME)
$y_i(n)$ TRACK FILE i VERTICAL VIDEO FRAME PIXEL LOCATION ESTIMATE AT FRAME n
$\hat{y}_i(n)$ TRACK FILE i VERTICAL VIDEO FRAME PREDICTED LOCATION ESTIMATE AT FRAME n
$\dot{y}_i(n)$ TRACK FILE i VERTICAL VIDEO FRAME PIXEL MOTION ESTIMATE AT FRAME n (PIXELS PER FRAME)
$\hat{\dot{y}}_i(n)$ TRACK FILE i VERTICAL VIDEO FRAME PREDICTED MOTION ESTIMATE AT FRAME n (PIXELS PER FRAME)
$x_{mj}(n)$ MEASUREMENT j HORIZONTAL VIDEO FRAME PIXEL LOCATION AT FRAME n
$y_{mj}(n)$ MEASUREMENT j VERTICAL VIDEO FRAME PIXEL LOCATION AT FRAME n
$x_{si}(n)$ MEASUREMENT j HORIZONTAL VIDEO FRAME OBJECT SIZE AT FRAME n
$y_{si}(n)$ MEASUREMENT j VERTICAL VIDEO FRAME OBJECT SIZE AT FRAME n
$c_i(n)$ TRACK FILE i CONRIDENCE AT FRAME n
$g_p$ POSITION FILTER GAIN
$g_m$ MOTION FILTER GAIN
$g_c$ CONFIDENCE FILTER GAIN
$g_s$ SIZE FILTER GAIN 1200 FOR (TRACK FILES i ASSOCIATED WITH MEASUREMENTS j) {
1205     Track_file[i].x_position = $x_i(n) = \hat{x}_i(n) + g_p(x_{mj}(n) - \hat{x}_i(n))$;
1207     Track_file[i].y_position = $y_i(n) = \hat{y}_i(n) + g_p(y_{mj}(n) - \hat{y}_i(n))$;
1210     Track_file[i].x_motion = $\dot{x}_i(n) = \hat{\dot{x}}_i(n) + g_m(x_i(n) - \hat{x}_i(n))$;
1212     Track_file[i].y_motion = $\dot{y}_i(n) = \hat{\dot{y}}_i(n) + g_m(y_i(n) - \hat{y}_i(n))$;
1215     Track_file[i].x_size = $x_{si}(n) = x_{si}(n-1) + g_s(x_{sj}(n) - x_{si}(n-1))$;
1217     Track_file[i].y_size = $y_{si}(n) = y_{si}(n-1) + g_s(y_{sj}(n) - y_{si}(n-1))$;
1220     Track_file[i].confidence = $c_i(n) = c_i(n-1) + g_c(1 - \hat{c}_i(n))$
1222     IF (Track_File[i].status.tvalid == FALSE) {
1225         Track_File[i]. update_count += 1;
1227             IF ( (Track_File[i].update_count > Minimum valid)  &&
1230                 (Track_File[i].confidence > Minimum valid)  ) {
1232         Track_File[i].status.tvalid = TRUE; } } }

1235     FOR (TRACK FILES i NOT ASSOCIATED WITH MEASUREMENTS) {
1237         Track_file[i].x_position = $x_i(n) = \hat{x}_i(n)$;
1240         Track_file[i].y_position = $y_i(n) = \hat{y}_i(n)$;
1242         Track_file[i].x_motion = $\dot{x}_i(n) = \hat{\dot{x}}_i(n)$;
1245         Track_file[i].y_motion = $\dot{y}_i(n) = \hat{\dot{y}}_i(n)$;
1247         Track_file[i].x_size = $x_{si}(n) = x_{si}(n-1)$;
1250         Track_file[i].y_size = $y_{si}(n) = y_{si}(n-1)$;
1252         Track_file[i].confidence = $c_i(n) = \hat{c}_i(n)$; }

FIG. 12

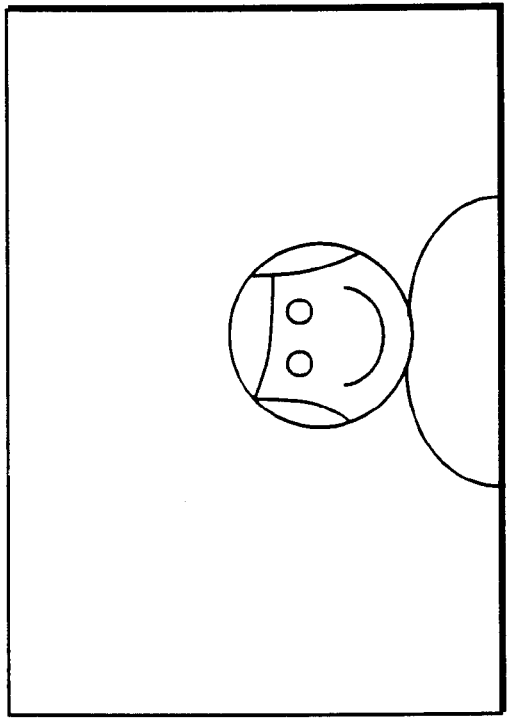
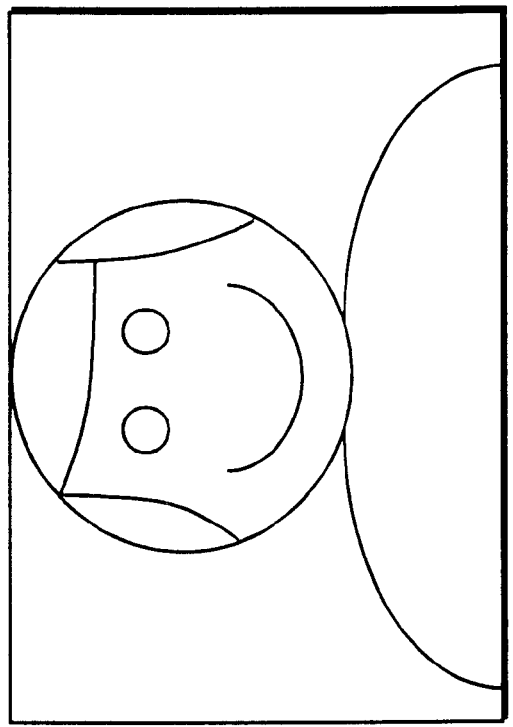
FIG. 18

TOP VIEW

| FIG. 26A |
| FIG. 26B |

LOCATING AN AUDIO SOURCE

BACKGROUND

This invention relates to systems, including video conferencing systems, which determine a direction of an audio source relative to a reference point.

Video conferencing systems are one variety of visual display systems and commonly include a camera, a number of microphones, and a display. Some video conferencing systems also include the capability to direct the camera toward a speaker and to frame appropriate camera shots. Typically, users of a video conferencing system direct the camera and frame appropriate shots.

SUMMARY

In one general aspect, the invention features a system which includes an image pickup device, an audio pickup device, and an audio source locator. The image pickup device generates image signals representative of an image, while the audio pickup device generates audio signals representative of sound from an audio source. The audio source locator processes the image signals and audio signals to determine a direction of the audio source relative to a reference point.

In another general aspect, the invention features a system including an image pickup device and a face detector. The image pickup device generates image signals representative of an image. The face detector processes the image signals to detect a region in the image having flesh tone colors, and determines, based on the detection, whether the image represents a face.

In yet another general aspect, the invention features a video conferencing system including microphones, a camera, a positioning device, a processor, and a transmitter. The microphones generate audio signals representative of sound from an audio source and the camera generates video signals representative of a video image. The positioning device is capable of positioning the camera, for example, for tilting, panning, or zooming the camera. The processor processes the video signals and audio signals to determine a direction of a speaker relative to a reference point and supplies control signals to the positioning device for positioning the camera to include the speaker in the field of view of the camera, the control signals being generated based on the determined direction of the speaker. The transmitter transmits audio and video signals, which can be the same as the audio and video signals used for locating the audio source, for video-conferencing.

In another general aspect, the invention features a system including microphones, a camera, a positioning device, a processor, and a transmitter. The microphones generate audio signals representative of sound from an audio source and the camera generates video signals representative of a video image. The positioning device is capable of positioning the camera, for example, for tilting, panning, or zooming the camera. The processor processes the audio signals to determine a direction of a speaker relative to a reference point and supplies control signals to the positioning device for positioning the camera to include the speaker in the field of view of the camera, the control signals being generated based on the determined direction of the speaker. The transmitter transmits audio and video signals, which can be the same as the audio and video signals used for locating the audio source, for video-conferencing.

Preferred embodiments may include one or more of the following features.

The image pickup device includes a positioning device for positioning the image pickup device. The audio source locator supplies control signals to the positioning device for positioning the image pickup device based on the determined direction of the audio source. The positioning device can then pan, tilt, and optionally zoom the image pickup device in response to the control signals. The audio source locator supplies control signals to the positioning device for positioning the image pickup device.

An integrated housing for an integrated video conferencing system incorporates the image pickup device, the audio pickup device, and the audio source locator, where the integrated housing is sized for being portable. In other embodiments, the housing can incorporate the microphones, the camera, the positioning device, the processor, and the transmitter.

An image of a face of a person who may be speaking is detected in a frame of video. The image of the face is detected by identifying a region which has flesh tone colors in the frames of video and may represent a moving face which is determined, for example, by comparing the frame of video with a previous frame of video. It is then determined whether size of the region having flesh tone colors corresponds to a pre-selected size, the pre-selected size representing size of a pre-selected standard face. If the region having flesh tone colors corresponds to a flesh tone colored non-human object, the region is determined not to correspond to an image of a face. The direction of the face relative to the reference point is also determined.

The audio source locator includes an audio based locator for determining an audio based direction of the audio source based on the audio signals and a video based locator for determining a video based location of an image in one of the frames of video. The image may be the image of the audio source which may be an object or a face of a speaking person. The audio source locator then determines the direction of the audio source relative to the reference point based on the audio based direction and the video based location.

The audio source locator detects the image of the face of a speaking person by detecting a speaking person based on the audio signals, detecting images of the faces of a plurality of persons based on the video signals, and correlating the detected images to the speaking person to detect the image of the face of the speaking person.

The audio source locator determines an offset of the video based location of the image from a predetermined reference point in a frame of video and modifies the audio based direction, based on the offset, to determine the direction of the audio source relative to the reference point. In this manner, the audio source locator can, for example, correct for errors in determining the direction of the audio source because of mechanical misalignments in components of the system.

The audio source locator uses a previously determined offset of a video based location of an image in a previous frame of video and modifies the audio based direction to determine the direction of the audio source. In this manner, the audio source locator can, for example, prevent future errors in determining the direction of the audio source because of mechanical misalignments in components of the system.

The audio source locator detects movements of a speaker and, in response to those movements, causes an increase in the field of view of the image pickup device. In this manner, audio source locator can, for example, provide for the image pickup device capturing a shot of the person as the person moves without necessarily moving the image pickup device to follow the person.

Audio source locator correlates the audio based direction detected based on the audio signals to the stored video based location of the image in a frame of video and modifies the audio based direction, based on the results of the correlation, to modify audio based direction to determine the direction of the audio source relative to the reference point. To do so, for example, audio source locator modifies its processing to improve its accuracy.

A memory unit stores a previously determined direction of an audio source based on the audio signals and a previously determined video based location of an image of a face of a non-speaker person in a previous one of the frames of video. The audio source locator uses the stored audio based direction and video based location to cause an adjustment in the field of view of the image pickup device to include, in the field of view, the audio source and the previously determined video based location. In this manner, the audio source locator can, for example, provide for room shots which include both speaking persons and nonspeaking persons.

The audio based locator detects a plurality of audio sources and uses at least one parameter to determine whether to validate at least one of the plurality of audio sources to use in producing the control signals for the image pickup device, where changing the parameter in one direction increases a likelihood of the audio based locator validating at least one of the plurality of audio sources and changing that parameter in another direction decreases the likelihood of validating at least one of the plurality of audio sources. The audio source locator correlates the audio based direction of the audio source with the stored video based location of the image in the some frame to determine whether the image in that video frame corresponds to the audio source. If the image in the that frame of video corresponds to the audio source, the audio based locator changes the parameter in the direction which increases the likelihood of validation. If the image does not correspond to the audio source, the audio based locator changes the parameter in the direction which decreases the likelihood of validation. In this manner, for example, the response time of the audio source locator is dynamically monitored and improved.

The audio source locator correlates the audio based direction of the audio source with the video based location of the image in a frame of video to determine whether the image corresponds to the audio source. If the audio source locator determines that the image fails to correspond to the audio source, the audio source locator causes an adjustment in the field of view of the image pickup device to include, in the field of view, the audio source and the video based location of the image in the frame of video. In this manner, for example, the audio source locator can allow for preventing gross camera pointing errors.

The audio source locator can also determine the distance from the reference point to the audio source. The audio based locator determines a distance from the reference point to the audio source based on the audio signals while the video based locator determines another distance from the reference point to the audio source based on an image associated with audio source. Audio source locator then determines a finalized distance based on the audio based distance and the video based distance.

In some embodiments, the video based locator determines a video based location of the image by detecting a region representing a moving person and determining, in part or in whole, a contour of an image of the moving person. The video based locator uses a parameter in detecting the contour of the image, where changing the parameter in one direction increases a likelihood of detecting contours of images and changing that parameter in another direction decreases the likelihood. The video based locator changes the parameter, when detecting the contour of the image, to increase or decrease the likelihood. For example, the video based locator determines a noise level where an increase in the noise level decreases the likelihood of detecting contours representative of the persons in a video image and the video based locator changes the parameter based on the noise level. For example, for a high noise level, the video based locator changes the parameter so as to increase the likelihood of detecting contours of images. In these embodiments, the audio source locator supplies control signals to the positioning device for positioning the image pickup device. The control signals include signals, based on the audio based direction detected based on the audio signals, for causing the positioning device to pan the image pickup device and signals, based on the video based location detected based on video, for tilting the image pickup device.

Embodiments of the invention include one or more of these advantages.

Determining the direction and/or location of an audio source relative to a reference point based on both audio and video provides for a system of checks and balances improving the overall performance of the automatic camera pointing system.

A low complexity and scaleable combination of common image processing blocks can be used to implement embodiments of the invention. Such embodiments can advantageously have low computational and memory requirements and at the same time deliver robust performance for various applications, such as video conferencing.

Various types of errors in some visual systems, such as video conferencing systems, which locate speakers based on audio signals can be corrected for and possibly prevented. The corrected for errors include mechanical pan and tilt misalignment errors, range measurement and associated zoom errors, and gross pointing errors. The errors which can be prevented include gross pointing errors. Additionally, the response time of such visual systems can be decreased.

In some embodiments, the performance of systems and algorithms for automatically setting up camera shots in such audio and visual systems are improved. For example, a better "room shot" can be obtained by including non-speaking persons detected based on video images. A moving speaker, such as one giving a presentation, can be tracked by tracking his image.

Also, in some embodiments of video conferencing systems, it is impractical to provide for a microphone array to provide tilt information, for example, because of the desired cost or size of the system. In such embodiments, audio based locator can find the audio based direction of the audio source and cause the camera positioning device pan the camera. Video based locator can then detect an image of the speaker and cause the camera positioning device tilt the camera. In this manner, an already available resource in the system (that is, video signals) is used to provide an otherwise unavailable feature, tilt.

Embodiments of the invention include integrated and portable video conferencing units. In these units, video images can be used for providing tilt information and possibly zoom information while the audio signals can be used for providing panning information.

Additionally, audio based locators are typically less computationally intensive than video based locators. Therefore, it is faster to locate the speaker using audio based detection, to move an image pickup device based on the audio based detection, and then to use the results from the video based locator to correct the camera positioning and framing.

Because the results from the audio based locator are not used by themselves but in combination with the video technology, embodiments of the audio based locator can be implemented using components which are not as precise as they may otherwise have to be.

BRIEF DESCRIPTION OF THE DRAWING

FIG. 6 is the pseudocode for an algorithm for creating a flesh tone binary map.

FIG. 7 is the pseudocode for an algorithm for detecting pixels in a current video frame corresponding to objects which have moved since the previous video frame.

FIG. 8 is the pseudocode for an algorithm for rejecting face segments based on their spatial luma variances and temporal luma difference variances.

FIG. 10 is the pseudocode for a prediction algorithm for estimating, for a current video frame, the location of the images of faces which were detected in a previous video frame.

FIG. 11 is the pseudocode for an association algorithm for associating the detected faces in the current video frame to existing track files.

FIG. 12 is the pseudocode for an algorithm for updating the track files.

FIG. 18 illustrates an error in framing a camera shot due to a range finding error.

DESCRIPTION

Figure 1:
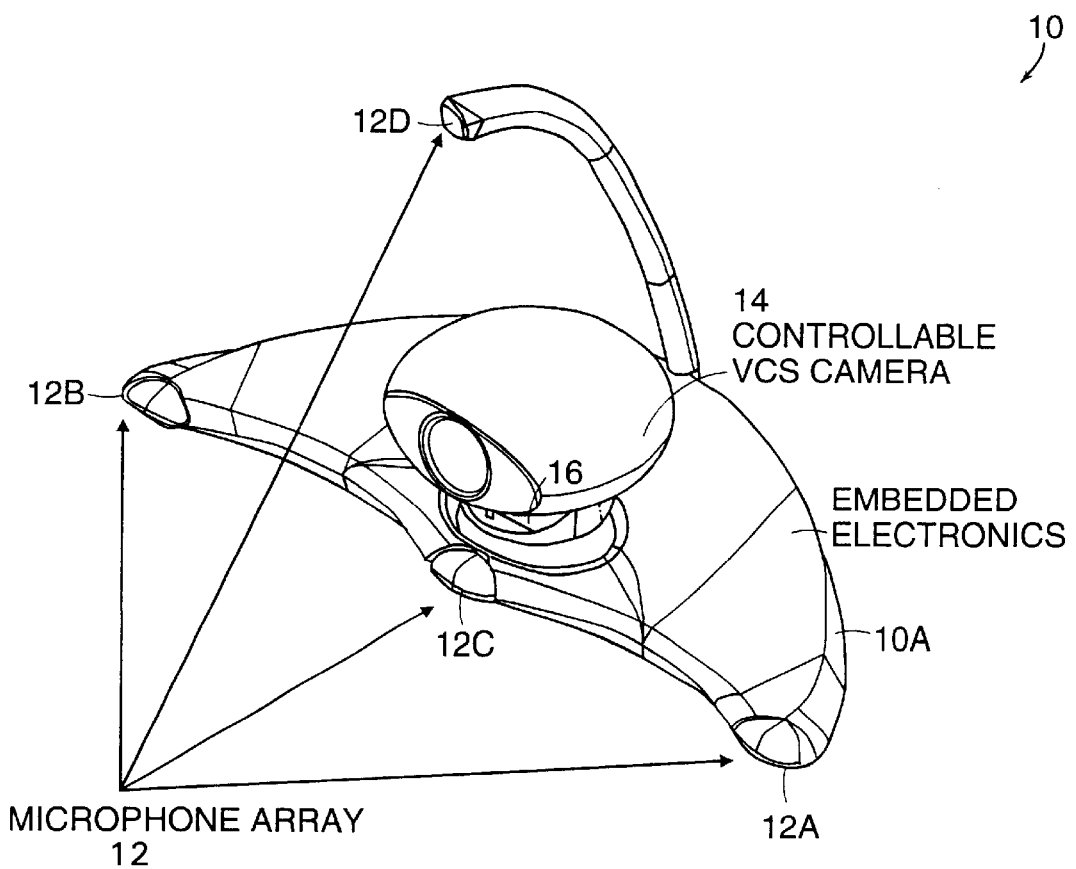
FIG. 1 shows an exemplary video conferencing system.

FIG. 1 schematically shows an exemplary video conferencing system 10. Video conferencing system 10 includes a video camera 14 and an array of microphones 12 which includes microphones 12A, 12B, 12C, 12D positioned a predetermined distance from one another in a predetermined geometry. Video camera 14 is mounted on a camera positioning device 16 capable of panning, tilting, and zooming video camera 14.

Briefly, during operation, video conferencing system receives sound waves from a human speaker and converts them to audio signals. Video conferencing system also captures video images of the speaker. Video conferencing system 10 uses the audio signals and video images to determine a location of the speaker(s) relative to a reference point, for example, camera 14 or the center of rotation of camera positioning device 16. Based on that direction, video conferencing system 10 can then pan, tilt, or zoom in or out camera 14 to obtain a better image of the speaker(s).

Generally, a location of the speaker relative to camera 14 can be characterized by two values: a direction of the speaker relative to camera 14, which may be expressed by a vector, and a distance of the speaker from camera 14. As is readily apparent, the direction of the speaker relative to camera 14 can be used for pointing camera 14 toward the speaker by panning or tilting camera 14 and the distance of the speaker from camera 14 can be used for zooming camera 14.

Figure 2:
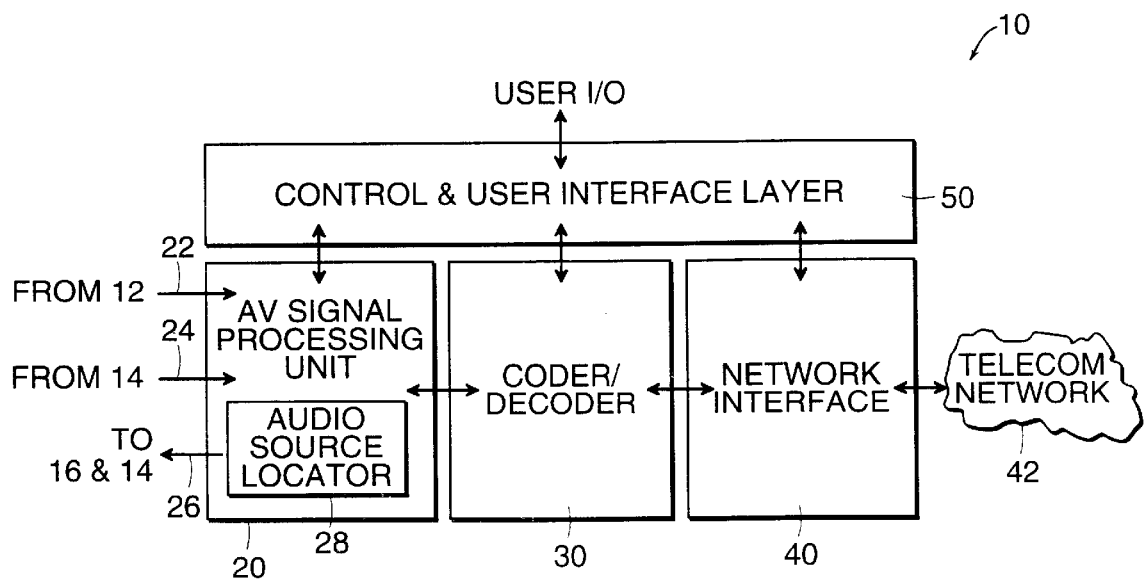
FIG. 2 schematically shows components of the video conferencing system.

FIG. 2 schematically shows components of video conferencing system 10. Microphones 12 and camera 14 respectively supply audio signals 22 and video signals 24 to an audio and video signal processing unit 20. Audio and video signal processing unit 20 includes an audio source locator 28 which analyzes the audio signals 22 and video signals 24 to determine the location of a speaker. Audio source locator 28 supplies camera control signals 26 to camera positioning device 16 and camera 14 for panning, tilting, and zooming camera 14.

Audio and video signal processing unit 20 also supplies a coder/decoder 30 with audio signals 22 and video signals 24. Coder/decoder 30 compresses the audio and video signals and then supplies the compressed video signals and the audio signals to a network interface 40 which transmits the signals across a telecommunication network 42 to a receiving video conference system (not shown). A control and user interface layer 50 allows a user to interact with and control the operation of the various components of video conferencing system 10 including audio and video signal processing unit 20, coder/decoder 30, and network interface 40.

Figure 3:
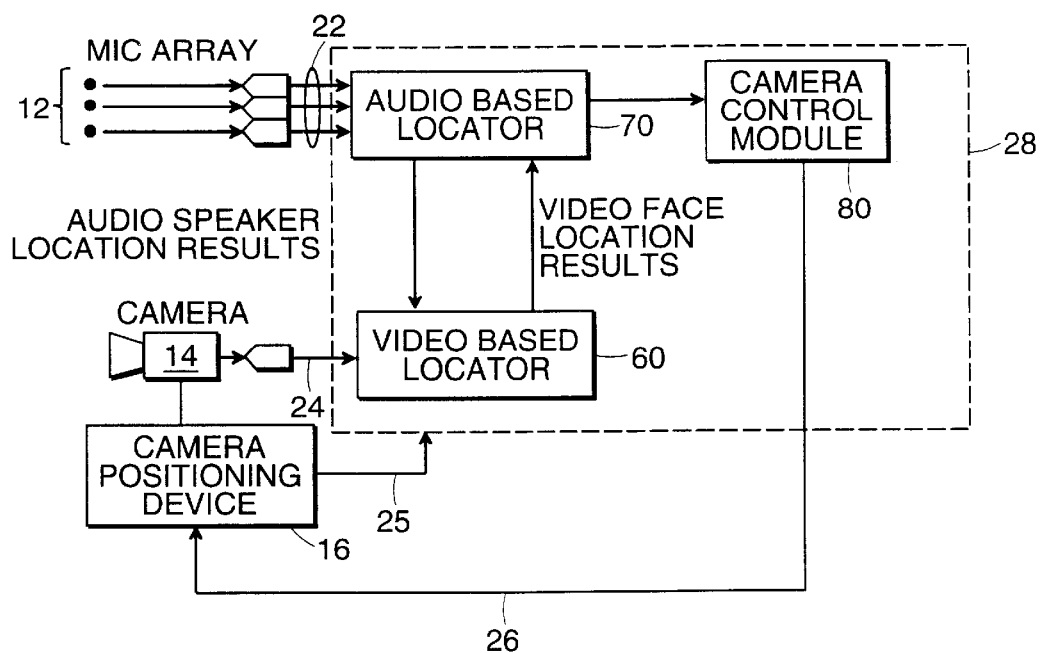
FIG. 3 shows the various functional modules of a camera pointing module in the video conferencing system.

FIG. 3 shows the various functional modules of audio source locator 28. These modules can be implemented, for example, by an appropriately programmed processor such as a microprocessor having suitable memories such as read only memory (ROM), random access memory (RAM) and/or other forms of memory. Alternatively, suitable processors for performing the functions of the modules in FIG. 3 include programmable digital signal processors, minicomputers, microcontrollers, programmable logic arrays and application specific integrated circuits. In other embodiments, some or all of the modules in FIG. 3 can be implemented to run on a processor which is not a part of video conferencing system 10.

It should be noted that, in video conferencing system 10, the various components and circuits constituting video conferencing system 10 are housed within an integrated housing 10A shown in FIG. 1. Integrated housing 10A is designed to be able to house all of the components and circuits of video conferencing 10. Additionally, integrated housing 10A can be sized to be readily portable by a person. In such an embodiment, the components and circuits can be designed to withstand being transported by a person and also to have "plug and play" capabilities so that video conferencing system can be installed and used in a new environment quickly.

In some alternative embodiments, microphone array 12, camera 14, camera positioning device 16, and audio source locator 28 may be separated from other components and included in an automatic camera positioning device. In such embodiments, a host video conferencing device incorporates the other components of video conferencing system 10. The automatic camera positioning device and the host video conferencing device then together constitute a video conferencing system.

Having described in general terms video conferencing system 10, the operation of audio source locator 28 of audio and video signal processor 20 will now be described in detail. An audio based locator (or audio based detector) 70 receives audio signals 22 and determines the location of a speaker (i.e an audio source) relative to the microphone array. Audio based locator 70 then generates a series of camera positioning directives with respect to panning, tilting, and zooming camera 14. These directives can be partly based on face detection and location analysis performed by a video based locator (or video based detector module) 60. Audio based locator 70 then supplies a camera control module 80 with these camera positioning directives. After camera control module 80 moves camera 14 according to these camera positioning directives, video based locator 60 analyzes the images in video frames 24 received as digital signals and stored as digital data in a memory storage unit (not shown). Video based locator 60 detects human faces in the images and determines their position relative to a reference point in the frame of video in which they are detected. Camera control module 80 then correlates a detected video face with the detected audio speaker and uses that correlation to correct or prevent camera framing errors.

Figure 4:
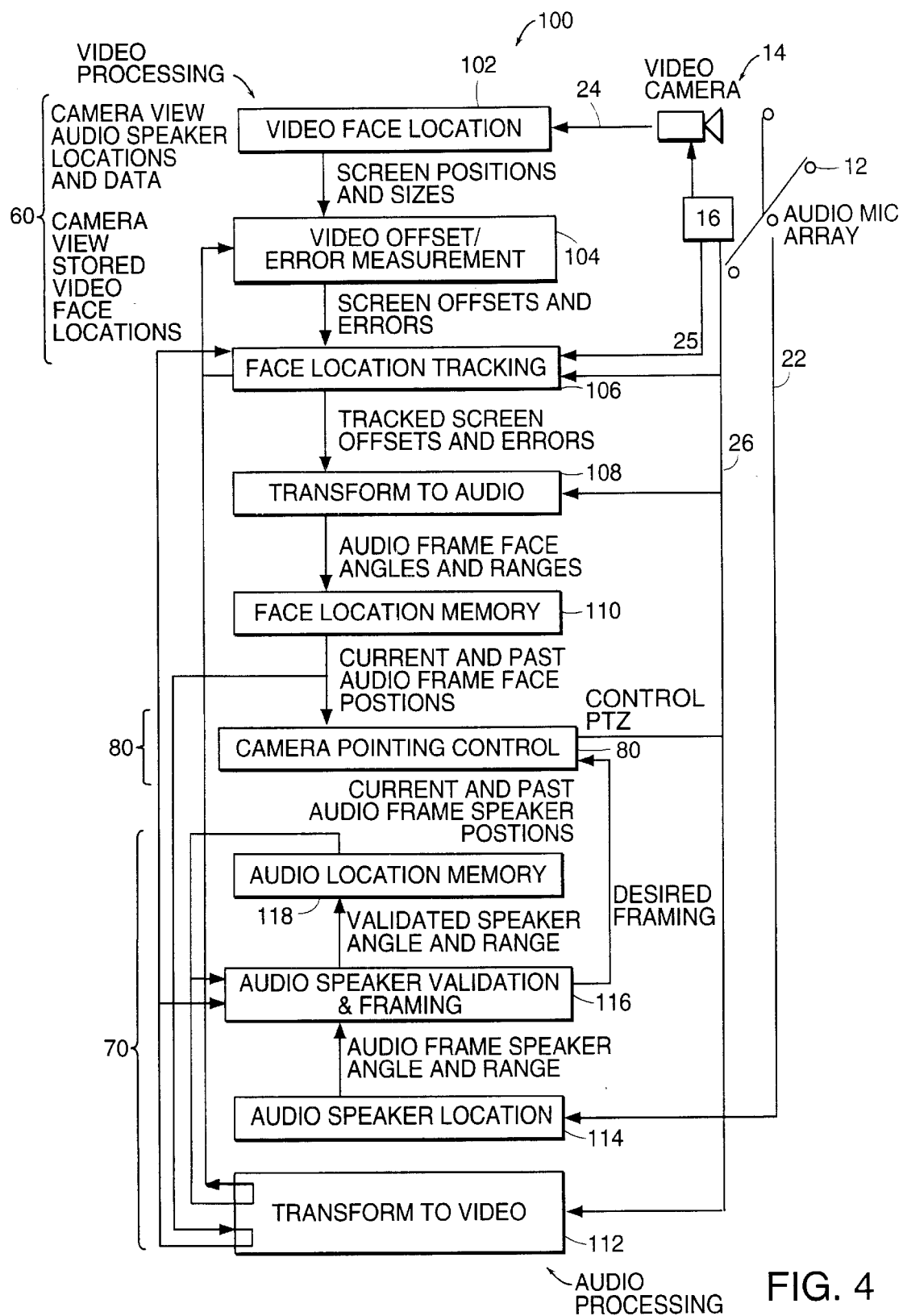
FIG. 4 is a flow chart of the operation of the camera pointing module.

FIG. 4 is a flow chart of the operation of audio source locator 28. Video based locator 60 includes processing modules 102–110, while audio based locator 70 includes processing modules 112–118. Each of these processing modules will be described in detail below. Briefly, a video face location module 102 analyzes video signals 24 to detect faces in a single video frame. A video offset/error measurement module 104 measures the offset of the location of the detected faces from some pre-determined and static reference point (for example, the center of the video image) and/or a dynamic reference point (for example, the currently detected speaker). A face location tracking module 106 correlates the detected faces from the current video frame to the detected faces in the previous video frames and hence tracks the detected faces through a series of frames. This tracking allows for obtaining a proper position of a speaker in a video frame who may be moving, as will be described below. To perform this tracking, face location tracking module 106 creates and maintains a track file for each detected face.

Modules 102–108 compute various measurements relative to a video coordinate system which is based on the video frame. The video coordinate system applies to each frame captured by camera 14. The video coordinate system has a horizontal or x-axis and a vertical or y-axis. When determining a position of a pixel or an image, modules 102–108 determine that position relative the x-axis and the y-axis of that pixel's or image's video frame. Camera control module 80 and audio based locator 70 in turn use an audio coordinate system which indicates a location of a speaker based on pan, tilt, and zoom angles which describe the direction of the speaker relative to camera 14 and range or distance from camera 14 to the speaker. A transform to audio coordinates module 108 converts coordinate measurements expressed in the video coordinate system to coordinate measurements expressed in the audio coordinate system using the pan, tilt, and zoom values of camera 14 when the frame was captured by camera 14. Conversely a transform to video coordinates module 112 of audio based locator 70 converts coordinate measurements expressed in the audio coordinate system to coordinate measurements expressed in the video coordinate system, also by using the pan and tilt values of camera 14 when the frame was captured by camera 14.

A face location memory module 110 stores in memory the results of the processing in modules 102–108, as will be described below.

In audio based locator 70, audio speaker location module 114 determines the location of a speaker based on audio signals 22. The results of this location determination is typically a set of pan, tilt, and range coordinate measurements. A speaker validation and framing module 116 determines whether the detected location of the speaker is a valid detection. Based on the results of the current and previous detections, speaker validation and framing module 116 then determines the most appropriate camera pan, tilt, and zoom (that is, the most appropriate camera shot or framing). Speaker validation and framing module 116 can use the measurements obtained in video based locator 60 to improve the appropriate camera shot, as will be described below. An audio location memory 118 stores the results of the processing in modules 114–116.

Camera control module 80 acquires from speaker validation and framing module 116 the desired camera framing directives. Camera control module 80 also acquires from video based locator 60 the offset and/or error measurements between the speaker locations detected based on the video signals and the audio signals. Camera control module 80 then uses the values acquired from video based locator 60 to adjust the desired camera framing acquired from audio based locator 70 to correct for mechanical misalignment errors, as will be described below in detail.

Figure 5:
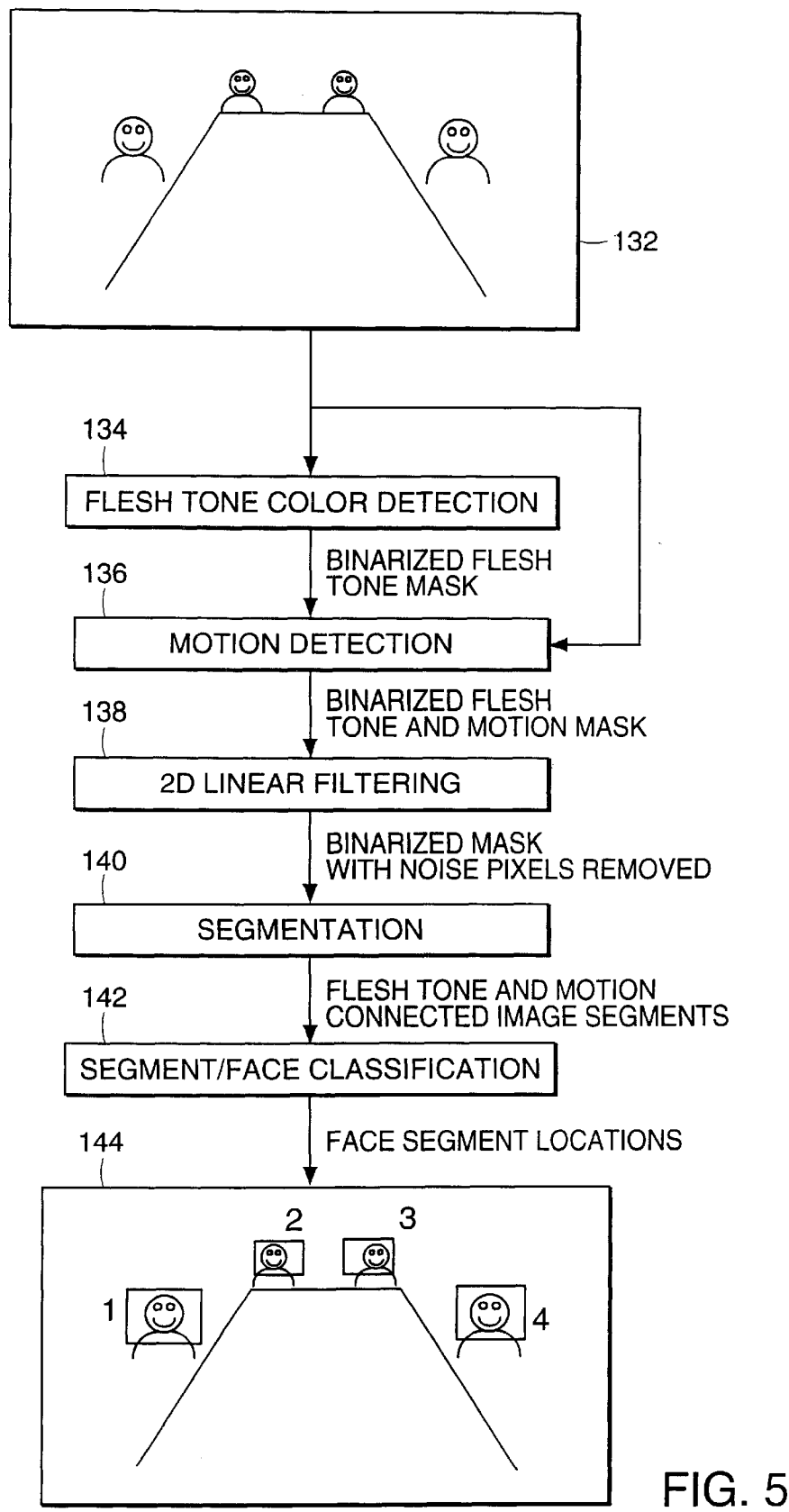
FIG. 5 is a flow chart of detailed steps performed by a video face location module.

The operation of various modules of video based locator 60 will now be described in detail. In video based locator 60, video face location module 102 analyzes current and previous frames of video images from camera 14 and determines the position of the faces in the current frame. FIG. 5 is a flow chart of the detailed steps performed by video face location module 102. Briefly, video face location module 102 identifies regions or segments in a frame which may contain a face based on detecting pixels which have flesh tone colors and which represent pixels which have moved.

Video face location module 102 first retrieves current and previous video frames 132 which are stored in memory. In the described embodiment, video frames for face detection are captured in 420 YUV format at 3–5 frames per second with a resolution of 320×240 pixels for luminance (luma) and 160×120 pixels for chrominance (chroma). The luma values are then down sampled to a lower resolution of 160×120. Alternatively, QCIF video with a resolution of 172×144 for luma and chroma can be used. In other embodiments, other video formats, resolution, etc. can be used.

Video face location module 102 then reduces, in step 134, the image in the retrieved frame to a flesh tone binary map, where each pixel that has a chroma value corresponding to flesh tone colors is assigned a value of "1" in the flesh tone binary map (hereinafter, referred to as a "flesh tone pixel"). FIG. 6 is the pseudocode for an algorithm 600 for creating the flesh tone binary map. For each pixel (step 605), video face location module 102 tests the chroma value of the pixel against chroma threshold values for flesh tone colors. These chroma or flesh tone threshold values can, for example, be set at –50<Cb<–5 and 7<Cr<60. These values result in detecting a high percentage of flesh tone pixels irrespective of the skin tone or the lighting. However, these threshold values also result in some falsely detected pixels which correspond to non-face objects whose color falls within the flesh tone threshold values. If the chroma value of the pixel being tested falls within the flesh tone threshold values (step 610), then video face location module 102 assigns a value of '1' to that pixel in the flesh tone map (step 615). If the chroma value of the pixel does not fall within the flesh tone threshold values (step 620), then video face location module 102 assigns a value of '0' to that pixel in the flesh tone map (step 625).

Referring back to FIG. 5, video face location module 102 next analyzes, in step 136, the frame to detect which flesh tone pixels in the flesh tone binary map correspond to objects which have moved since the previous frame (hereinafter, "motion pixels"). A human face is usually moving. Therefore, by identifying pixels which do not correspond to moving objects, video face location module 102 rejects a high percentage of falsely detected flesh tone pixels. FIG. 7 is the pseudocode for an algorithm 700 for detecting motion pixels. For each pixel (step 705), if the flesh tone binary map value for that pixel is '1' (step 710), then video face location module 102 determines whether the pixel is also a motion pixel. To do so, video face location module 102 tests the luma value of that pixel against the luma value of the same pixel in the previous frame. If the absolute difference of the luma values is less than to a motion threshold value (in the described embodiment, the value of the motion threshold value is 5 for an 8 bit luma), then video face location module 102 determines that the pixel corresponds to a non-moving object and reassigns the flesh tone binary map value for that pixel to '0' (steps 715–720).

Referring back to FIG. 5, after motion detection step 136, video face location module 102, in step 138, applies a filter to the flesh tone detection to reduce false detections resulting from noise (step 138). Various types of filters can be used for filtering out or reducing the effect of noise. In the described embodiment, video face location module 102 uses a linear two dimensional filter, namely a 5×5 box car filter with unity coefficients. Video face location module 102 applies this filter to a particular pixel by adding the number of positive flesh tone and motion detections in a 5×5 square of pixels surrounding the pixel being filtered. If the sum is above a pre-determined threshold value, then the flesh tone binary map value for that pixel is set to "1". Otherwise, video face location module 102 sets the flesh tone binary map value for that pixel to '0'.

Video face location module 102 then, in step 140, segments the flesh tone binary image map into rectangle segments (or boxes) surrounding regions which contain contiguous areas of flesh tone pixels and therefore may contain images of faces (hereinafter, referred to as a "face segments"). To segment the image, video face location module 102 scans each row of the flesh tone binary map to determine the start and end of each set of contiguous flesh tone pixels in the row where each pixel in a set has a chroma value close to the average chroma value for that entire set. When video face location module 102 finds such a set, video face location module 102 determines the difference between the location and average chroma value of the set and the location and average chroma values of all the previously identified face segments in the current frame. Video face location module 102 then attaches the set of pixels to the face segment for which the calculated difference was within a predetermined threshold value and was also the minimum difference calculated for all previously identified face segments. Video face location module 102, if necessary, adjusts the size of the face segment to include the new set of pixels. Additionally, video face location module 102 recalculates the average chroma value for that face segment within the additional new set of pixels. Video face location module 102 in this manner assigns each flesh tone pixel to a face segment. If a set of pixels does not match a previously detected face segment, then video face location module 102 uses the set of pixels to create a new face segment.

In segment/face classification step 142, video face location module 102 then examines all of the detected face segments and rejects those face segments which do not likely represent a face. Video face location module 102 uses two methods to determine whether a face segment likely represents a face. According to the first method, video face location module 102 determines whether the size of the face segment corresponds to a default size of the image of a typical or preselected standard head given the camera range value. If the size of a face segment is less than the default image size at that range (or a scaled default image size at that range, such as 125% of the default image size), video face location module 102 determines that the face segment likely does not represent a face. Additionally, if the proportions of a face segment are not within a range for a typical head (for example, width to height ratio of 1.5), video face location module 102 determines the face segment likely does not represent a face.

According to the second method, video face location module 102 rejects face segments which have been detected because of shadows moving over flesh tone colored backgrounds or because of objects moving over flesh tone colored background. To do this, briefly, video face location module 102 rejects face segments having spatial luma variance or temporal luma difference variance below pre-determined threshold values. FIG. 8 is the pseudocode for an algorithm 800 for rejecting face segments based on spatial luma variance and temporal luma difference variance.

Generally, movement of shadows over flesh tone colored stationary objects cause the pixels for the flesh tone colored stationary objects to be detected as flesh tone pixels and motion pixels. In these face segments, because of the movement of shadows, all luma values of the face pixels are generally reduced by the same amount from the corresponding luma values in the previous frame. Therefore, the temporal luma difference variance for a face segment between the current and the previous frame is relatively small. (The temporal luma difference variance of a face segment is the variance of the difference between the luma value of the pixel between the current and previous frames from a mean difference, between the current and previous frames, of all luma values for the pixels in that face segment.) In the case of most other moving objects which are not subject to shadows, the difference in the luma values varies significantly from the mean difference and hence the temporal luma difference variance is relatively large.

Steps 805–825 in algorithm 800 in FIG. 8 use the temporal luma difference variance to detect face segments which have been classified as face segments but more likely represent stationary objects subject to moving shadows. For each face segment (step 805), video face location module 102 calculates the mean difference in the luma values for that face segment between the current frame and the previous frame (step 810). To do so, for each pixel in the face segment, video face location module 102 computes the difference in the luma values from the previous frame. Video face location module 102 then adds these differences and divides the sum by the size of the face segment to obtain the mean difference in luma values. Video face location module 102 then determines, for each pixel, the squared difference between the mean difference in luma values computed in step 810 and the difference in luma values between the current frame and the previous frame (step 815). Video face location module 102 adds these squared differences and divides the sum by the size of the face segment to determine the temporal luma difference variance for the face segment (step 815). If the temporal luma difference variance for the face segment is below a predetermined threshold value (step 820), video face location module 102 determines that the face segment is likely not an image of a face (step 825).

Additionally, as stated above, video face location module 102 uses spatial luma variances to reject face segments which represent uncovered, flesh-tone background. For example, when a person moves in front of a flesh tone colored door, video face location module 102 identifies the trailing edge of the image of the person as moving pixels. Similarly, video face location module 102 may identify hands which move over a flesh-colored table as moving pixels. To identify these false face segments, video face location module 102 uses the fact that uncovered flesh tone colored objects are typically smooth, while faces have multiple edges and are not smooth. Therefore, video face location module 102 calculates the spatial luma variance of each face segment and rejects the face segments which have variances less than a pre-determined threshold value. The spatial luma variance for a face segment is the sum of the squared differences between luma values for all pixels in a face segment from the mean luma value for that face segment divided by the size of the face segment.

Steps 805 and 830–845 in algorithm 800 in FIG. 8 use the spatial luma variances for the detected face segments to reject false face segments which more likely represent flesh tone background. For each face segment (step 805), video face location module 102 computes the mean luma value for that face segment (step 830). To do so, video face location module 102 adds the luma values of all of the pixels in that face segment and divides the sum by the size of the face segment. Video face location module 102 then determines the sum of the squared differences of the luma value of each pixel in the face segment from the mean difference in luma values computed in step 830. Video face location module 102 divides the sum by the size of the face segment to determine the spatial luma variance of that face segment (step 835). If the spatial luma variance of the face segment is below a predetermined threshold value (step 840), video face location module 102 determines the face segment being examined is not an image of a face (step 845).

At this point, video face location module 102 assumes that all remaining face segments represent faces. After segment/face classification step 142, video face location module 102 reduces the flesh tone binary map to a map 144 having a number of face segments representing detected faces.

Referring back to FIG. 4, after video face location module 102 finishes executing, video offset/error measurement module 104 determines the offset of detected faces in the camera view from a video coordinate reference point. The reference point can be a fixed reference point (for example, the center of the camera image or a frame of video) or a dynamic reference point (for example, location of a speaker detected by audio based locator 70). In either case, for each detected face, video offset/error measurement module 104 computes the offset by determining the X-axis and Y-axis difference between the center of the detected face and reference point. Where the reference point is a location of a speaker detected by audio based locator 70, audio based locator 70 first converts the coordinates of the reference point from the audio coordinate system to the video coordinate system (step 112). Video offset/error measurement module 104 then uses these converted values to calculate the offset.

After video offset/error measurement module 104, face location tracking module 106 is performed. Generally, face location tracking module 106 associates detected faces in the current frame (that is, currently detected faces) to previously detected faces in existing track files. Face location tracking module 106 then updates the existing track files. Face location tracking module 106 also creates new track files for those currently detected faces that can not be associated with existing track files. The results of face location tracking module 106 are typically used for framing camera shots in the cases where the video conferencing system 10 moves camera 14 to track a moving speaker, as will be described below.

Each track file corresponds to one detected face and stores parameters for that face. The stored parameter values not only include those associated with the current video frame but also, if required, those associated with the previous video frames in which the face was detected. The parameters include location, size, and parameters associated with movement. The track files can also store the audio coordinate pan, tilt, and range values associated with detected faces for the particular frames in which the faces were detected. Additionally, the track files can store the values for the number of frames in which the face has been detected (hereinafter, "update_count") and the number of frames since the last time the face was detected (hereinafter, "noupdate_count"). The track files also can store a confidence measurement of the accuracy of any estimated, or predicted location based on the values stored in the track file.

Figure 9:
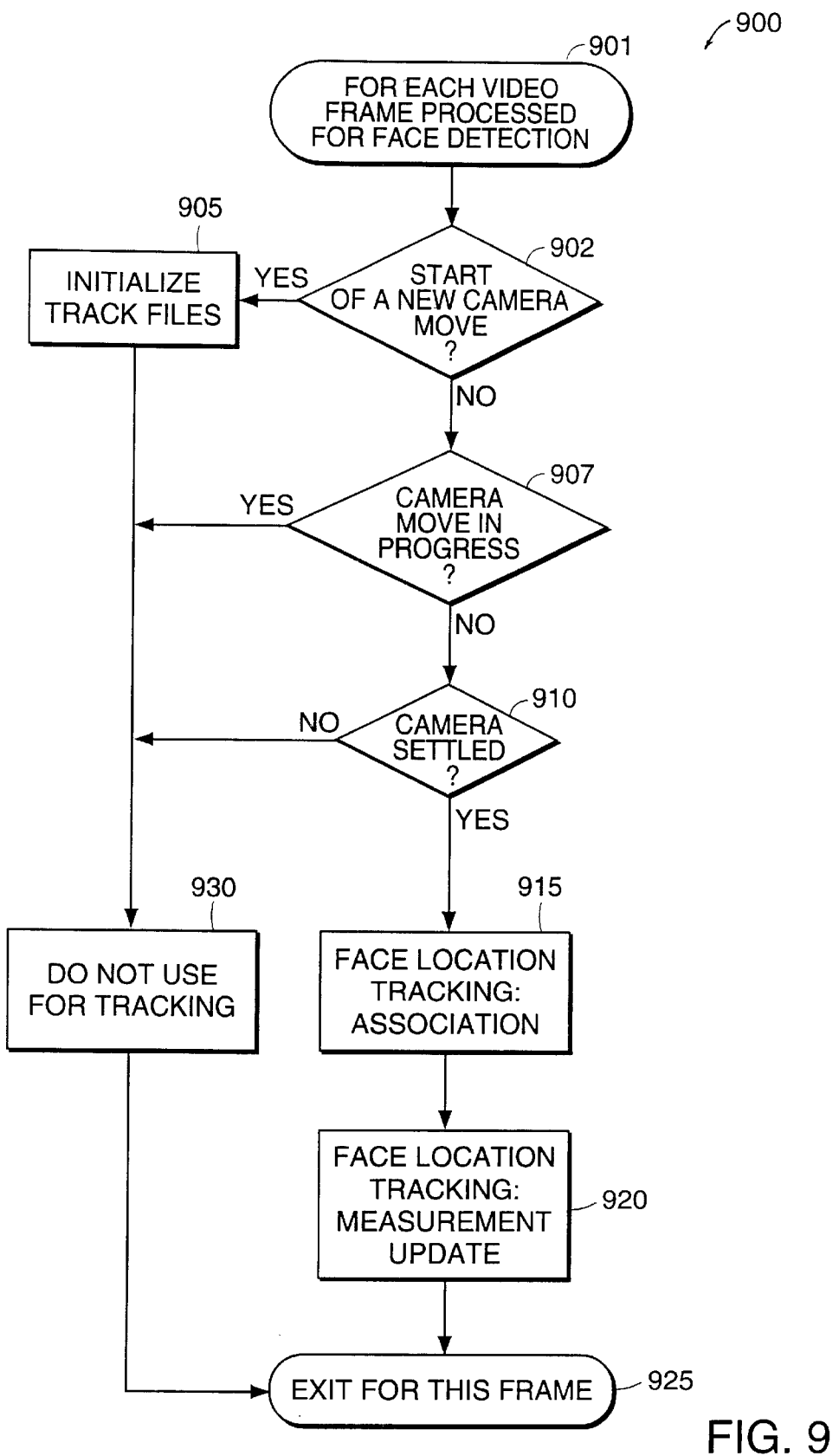
FIG. 9 shows a flow chart of the steps taken by a face location tracking module.

FIG. 9 shows a flow chart 900 of the steps taken by face location tracking module 106. For each video frame processed for face detection (step 901), face location tracking module 106 first determines whether the frame of video was captured at the start of a new camera move (step 902). If so, face location tracking module 106 initializes the initial set of track files (step 905). The initial set of track files can be either a set of new track files or all of the existing track files.

Face location tracking module 106 determines which initial set of track files to use based on how the track files will be used. If the initial set of files includes only new track files, then face location tracking module 106 creates a new track file for each detected face in the current frame. These track files are then populated with the pan, tilt, and range values or audio location of the face and the parameters associated with the detected faces in the current frame such as video coordinates size, location, offset, motion, and other measurements from modules 104 (FIG. 4), as needed. Face location tracking 106 does not use the video frame at the start of a new camera move for face tracking (step 930) and the face tracking processing for this video frame ends (step 925).

If face location tracking module 106 determined that the video frame was captured at the start of a new camera move (step 902), face location tracking module 106 next determines whether the video frame was captured when a camera move was in progress (step 907). If a camera move was in progress, face location tracking module 106 does not use the video frame for face tracking processing (steps 907, 930) and the face tracking processing for this video frame ends (step 925).

If the video frame was captured when a camera move was not in progress, face location tracking module 106 in step 910 determines whether the camera was settled when the video frame was captured, that is, whether all camera movements which affect the video face location processing had stopped). These movements include camera pan, tilt, zoom, auto-focus, auto-white balance, and auto-exposure. Face location tracking module 106 determines whether camera 14 had settled by either sampling camera settling signals 25 (FIGS. 3 and 4) until the signals stop changing or by waiting for some pre-determined time period after a camera move starts.

If the video frame was captured when camera 14 had not settled, then face location tracking module 106 does not use the video frame in face location tracking (steps 910, 930) and the face tracking processing for this video frame ends (step 925). If face location tracking module 106 determines that camera 14 had settled (step 910), face location tracking module 106 attempts to associate the location of detected faces in the video frame with the existing track files (step 915). (In the case where the existing track files are not used in step 905, face location tracking module 106 does not perform steps 915 and 920.) Associating the location of the detected faces involves the following steps, described here in general terms:

Propagation or prediction of position, confidence, and search bounds: In general terms, this step involves, based on the track files associated with the previous frame, predicting estimates of the locations in the current video frame of the faces detected in the previous video frame. This step also involves calculating a confidence value for that estimation.

Ordered association of the current detected faces and the track files associated with the previous frame: In general terms, this step involves, for each track file, determining the likelihood that each currently detected faces corresponds to the track file. Face location tracking module 106 then determines which of the detected faces passes a minimum threshold of likelihood and also has the highest measure of likelihood. Face location tracking module 106 then associates that detected face to the track file.

Deletion of old files based on the value of noupdate_count variable.

Creation of new files for detected faces in the current frame not associated with existing track files.

Each of these steps will now be described in detail. FIG. 10 is the pseudocode for a prediction algorithm 1000. In the described embodiment, face location tracking module 106 uses a fixed gain filter to predict the new values. In other embodiments face location tracking module 106 can use more complex filters such as variable gain filters as in Kalman filters.

For all track files i (step 1005), face location tracking module 106 predicts the horizontal or x-axis location of a pixel that represents the center of a detected face (hereinafter, the center pixel) corresponding to a track file (step 1010). To compute the predicted value of the horizontal location of the center pixel ($\hat{x}_i(n)$), face location tracking module 106 adds the estimated location of the center pixel in the previous frame ($x_i(n-1)$) to the horizontal value of the estimated pixel motion associated with the previous frame ($\dot{x}_i(n-1)$). (The unit of measurement used for the various motion variables is a unit of speed expressed in terms of number of pixels per video frame.) Face location tracking module 106 computes the predicted value of the pixel motion when updating the track files, as will be described below. In step 1015, face location tracking module 106 computes the predicted horizonal value of the pixel motion associated with the current frame ($\dot{x}_i(n)$) by multiplying the horizontal value of the estimated pixel motion of the previous frame ($\dot{x}_i(n-1)$) by a predetermined fixed gain value ($g_{md}$). Face location tracking module 106 then performs steps 1020 and 1025 which are similar to steps 1010 and 1015 and calculates the vertical axis (y-axis) values. In step 1030, face location tracking module 106 computes the value of the confidence parameter for the current prediction ($\hat{c}_i(n)$) by multiplying the confidence value in the track file ($c_i(n-1)$) by a fixed gain value ($g_{cd}$)

After the prediction step, face location tracking module 106 attempts to associate the detected faces in the current video frame to the existing track files. FIG. 11 is the pseudocode for an association algorithm 1100 for associating the detected faces in the current video frame to the existing track files. Generally, face location tracking module 106 compares each track file to all detected faces. Face location tracking module 106 associates a detected face to a track file, if the distance along the x- and y-axes between the position of the detected face and the predicted position of the face associated with that track file is smaller than the difference for all other detected faces.

For each track file i (step 1105), face location tracking module 106 determines whether the track file is an initialized and active track file (step 1107). If the track file is an initialized and active track file, then face location tracking module 106 determines for each detected face j whether the distance along the x- and y-axes between the position of the detected face and predicted position values for the track file is less than the maximum distance threshold values (steps 1110–1112).

In the described embodiment, the maximum distance threshold values are statistical bounds based on two variances, measured in each of the x- and y-axes: variance of the position of a typical pixel from one frame to the next ($\sigma^2_{xx}$ and $\sigma^2_{yy}$) and the variance in the measurement of pixel locations in the current frame due to various errors in measurement ($\sigma^2_{xm}$ and $\sigma^2_{ym}$). In the described embodiment, the statistical bound assumes that both variances have a constant value for a given camera zoom setting.

However, in other embodiments, the variances may be unique for each frame based on previous measurements or based on input from sensors monitoring the operation of the equipment. The statistical bound is computed as three times the standard deviations calculated as the sum of each of the variances in each of the x- and y-axes:

$$s_{x_i}(n) = 3\sqrt{\sigma_{xx}^2 + \sigma_{xm}^2}$$

$$s_{y_i}(n) = 3\sqrt{\sigma_{yy}^2 + \sigma_{ym}^2}$$

where $\sigma_{xx}^2$ is the horizontal position variance; $\sigma_{yy}^2$ is the vertical position variance; $\sigma_{xm}^2$ is the horizontal measurement variance; and $\sigma_{ym}^2$ is the vertical measurement variance.

If the distance between the detected face j and the predicted values for the track file are less than the maximum distance threshold values (steps 1112), the detected face j is marked as a possible candidate for association with the track file (step 1115).

For all face candidates for associations with track file i in the current frame, face location tracking module 106 next attempts to find a candidate face that is closest to the predicted value for the track file (steps 1117–1122) and selects that face for association with track file i. In step 1117, face location tracking module 106 first determines whether any of the detected faces were marked as a possible candidate for association with track file i. If so, for each such candidate j (step 1120), face location tracking module 106 calculates the distance ($d_{ij}$) between the center pixel of the detected face and the center pixel in the track file i (step 1122). Face location tracking module 106 then finds the minimum of these calculated distances ($d_{ij}$) (step 1125) and marks the corresponding detected face as being associated to track file i (step 1127). In step 1130, face location tracking module 106 marks the track file as having been associated to a detected face in the current video frame and, in step 1132, resets the value of variable noupdate_count. Face location tracking module 106 then populates the track file i with the values associated with the matching detected face, namely the location of the center pixel (steps 1135–1137) and the dimensions of the detected face (steps 1140–1142).

If, in steps 1110–1115, face location tracking module 106 does not find any suitable candidates for association among the detected faces in the current video frame, face location tracking module 106 marks track file i as not having been associated to a detected face (step 1147). Face location tracking module 106 then increments the variable noupdate_count (step 1150).

As stated above, after associating the detected faces to the track files, face location tracking module 106 deletes track files which for more than a predetermined number of frames have not been associated with a detected face. Face location tracking module 106 deletes a track file by marking the track file as not being initialized and resetting the variables in the track file.

In some cases, after attempting to associate the detected faces with the existing track files, some detected faces in the current video frame remain as not associated with any existing track file. In that case, the values associated with the detected face are populated in a new track file. Additionally, the value of the confidence parameter ($c_i(n)$) for the current frame is set to a predetermined value (for example, 0.5). Also, the horizontal and vertical pixel motion variables ($\dot{x}_i(n)$ and $\dot{y}_i(n)$) are set to a predetermined value (for example, zero).

Referring back to FIG. 9, at this point, face location tracking module 106 updates the various parameters in the track files based on whether a track file has been associated with a detected face in the current video frame (measurement update step 920). Generally, each parameter is updated based on the value for that parameter in the current and previous frames, the predicted value for that parameter, and a gain value that represents an estimate of errors due to various equipment imperfections.

FIG. 12 is the pseudocode for an algorithm 1200 for updating the track files. For each track file i which has been associated with a detected face in the current frame (step 1202), face location tracking measurement update module 920 updates a number of variables in the track file. In steps 1205–1207, face location tracking module 920 computes the horizontal and vertical center pixel values for the track file i ($x_i(n)$ and $y_i(n)$, respectively). To determine these values, face location tracking module 920 first subtracts the corresponding predicted center pixel value ($\hat{x}_i(n)$ and $\hat{y}_i(n)$) from the center pixel value of the associated detected face measurement ($x_{mj}(n)$ and $y_{mj}(n)$) The result is then multiplied by a gain value ($g_p$) compensating for an expected average error due to various equipment defects. Face location tracking module 920 then adds the result of this multiplication to the corresponding predicted center pixel value ($\hat{x}_i(n)$ and $\hat{y}_i(n)$)

In steps 1210 and 1212, face location tracking module 920 computes the horizontal and vertical pixel motion values for the track file i ($\dot{x}_i(n)$ and $\dot{y}_i(n)$, respectively). To determine these values, face location tracking module 106 first subtracts the corresponding predicted pixel position value ($\hat{x}_i(n)$ and $\hat{y}_i(n)$) from the horizontal and vertical center pixel values for the track file i ($x_i(n)$ and $y_i(n)$) calculated in steps 1205–1207. The result is then multiplied by a gain value ($g_m$) compensating for an expected average error due to various equipment defects. Face location tracking module 106 then adds the result of this multiplication to the corresponding predicted pixel motion value ($\hat{\dot{x}}_i(n)$ and $\hat{\dot{y}}_i(n)$).

In steps 1215 and 1217, face location tracking module 106 computes the horizontal and vertical size values for the track file i ($x_{si}(n)$ and $y_{si}(n)$, respectively). To determine these values, face location tracking module 106 first subtracts the corresponding size value in the track file from the previous frame ($x_{si}(n-1)$ and $y_{si}(n-1)$) from the size values for the associated detected face ($x_{sj}(n)$ and $y_{sj}(n)$). The result is then multiplied by a gain value ($g_s$) compensating for an expected average error due to various equipment defects. Face location tracking module 106 then adds the result of this multiplication to the corresponding size value in the track file from the previous frame ($x_{si}(n-1)$ and $y_{si}(n-1)$).

Face location tracking module 106 next calculates the confidence value for the values that now populate the track file (step 1220). Face location tracking module 106 first subtracts the predicted confidence value ($\hat{c}_i(n)$) from one and multiplies the result by a gain value ($g_c$). Face location tracking module 106 then adds the result to the the estimated confidence value for the previous frame ($\hat{c}_i(n-1)$).

Face location tracking module 106 then validates the track files in steps 1225–1232. Generally, face location tracking module 106 assumes a track file is invalid until it is validated. In step 1225, if a track file with which a face detection is associated is marked as invalid, face location tracking module 106 increments the value of the update_count variable (step 1227). If the value of the update_count variable and the value of the confidence variable of the track file are each greater than a corresponding threshold value required from a valid frame (step 1230), then face location tracking module 106 validates the track file by marking it as such (step 1232).

For each track file i which has not been associated with a detected face in the current video frame (step 1235), face location tracking module 106 also updates a number of variables in the track file. Face location tracking module 106 populates the horizontal and vertical center pixel values for the track file i ($x_f(n)$ and $y_f(n)$, respectively), the horizontal and vertical pixel motion values for the track file i ($\dot{x}_f(n)$ and $\dot{y}_f(n)$, respectively), and the confidence variable ($c_f(n)$) with the predicted values (steps 1237–1245 and 1252). Face location tracking module 106 sets the horizontal and vertical size values for the current video frame ($x_{sf}(n)$ and $y_{sf}(n)$, respectively) with the values associated with the previous video frame in which the detected face measurements were updated.

Referring back to FIG. 4, after face location tracking module 106, transform to audio coordinates module 108 converts the tracked location values to audio coordinate system.

After transform to audio coordinates module 108, face location memory module 110 stores the values of the various parameters associated with the detected faces in the current video frame in files associated with the detected faces. Generally, face location memory module 110 stores the result of the analysis in the previous modules for future access when the camera view may not contain a particular region of interest. Which of the results are stored depends on how the data will be used in the future. The stored data can include location and size of detected faces. Additionally, the stored data can be organized by unique numbers assigned to each face or by spatial sectors. The data also includes the results of face location tracking after being converted into the audio coordinate system. At this point, video based locator 60 finishes its analysis.

Having described the operation of video based locator 60, the operation of the audio based locator 70 will now be described. Audio speaker location module 114 of audio based locator 70 detects the location of a speaker based on audio signals from microphone array 12. A method of locating a speaker based on audio signals from a plurality of microphones is described in detail in the commonly assigned application, incorporated herein by reference, entitled "Method and Apparatus for Localization of an Acoustic Source", Ser. No. 08/663,670, filed on Jun. 14, 1996 (hereinafter, "the '670 application"). Briefly, the method in the '670 application uses at least two microphones spaced from one another. According to the method in the '670 application, generally, audio speaker location module 114 processes the audio signals by determining whether signals acquired during a particular time frame represent the onset or beginning of a sequence of audio signals from the sound source. Audio speaker location module 114 identifies received audio signals representative of the sequence of signals when the data represents the beginning of the sequence. Audio speaker location module 114 then determines the location of the source based upon the received audio signals.

The onset or beginning of a sequence of audio signals from the source is detected on a frequency-by-frequency basis. Data associated with those frequency components of acquired signals which satisfy the following two conditions are deemed to be representative of signals occurring at the onset of a sequence of audio signals from the source. First, the magnitude of the frequency component should preferably be greater than the background noise energy for that frequency by at least a predetermined amount. Second, the magnitude of the frequency component should preferably be greater, by at least a predetermined amount, than the magnitude of corresponding frequency component acquired during a predetermined number of preceding time frames.

If the two conditions are met for a particular frequency component during a particular time frame, then it is assumed that an onset condition is met with respect to that frequency. A cross-spectrum for the audio signals acquired by the pair of microphones during the time frame is generated with respect to each such frequency component, and a cross-spectrum for the noise at each such frequency is subtracted to identify the audio received signals representative of the sequence of signals from the audio source. The audio cross-spectrum is accumulated during a predetermined length of time. If at the end of the predetermined time period, non-zero values for at least a specified number of frequencies have been accumulated, then the accumulated cross-spectrum values are then used to compute (that is, are transformed to) cross-correlation values. The cross-correlation values in turn are used to determine the time delay between signals arriving at the pair of microphones from the common source. These time delays are then used to determine the direction and bearing angle of the audio source with respect to the microphones which are used to determine a location of the audio source source from a predetermined reference point such as the camera).

By using an array of microphones 12, audio speaker location module 114 provides both tilt and pan information with respect to the detected audio source. Audio speaker location module 114 also uses this information to determine the distance (that is, range) to the audio source.

Audio speaker location module 114 also provides a pair of normalized cross-correlation values, one for the horizontal microphones (that is, the pan microphones) and one for the vertical microphones (that is, the tilt microphones).

Figure 13:
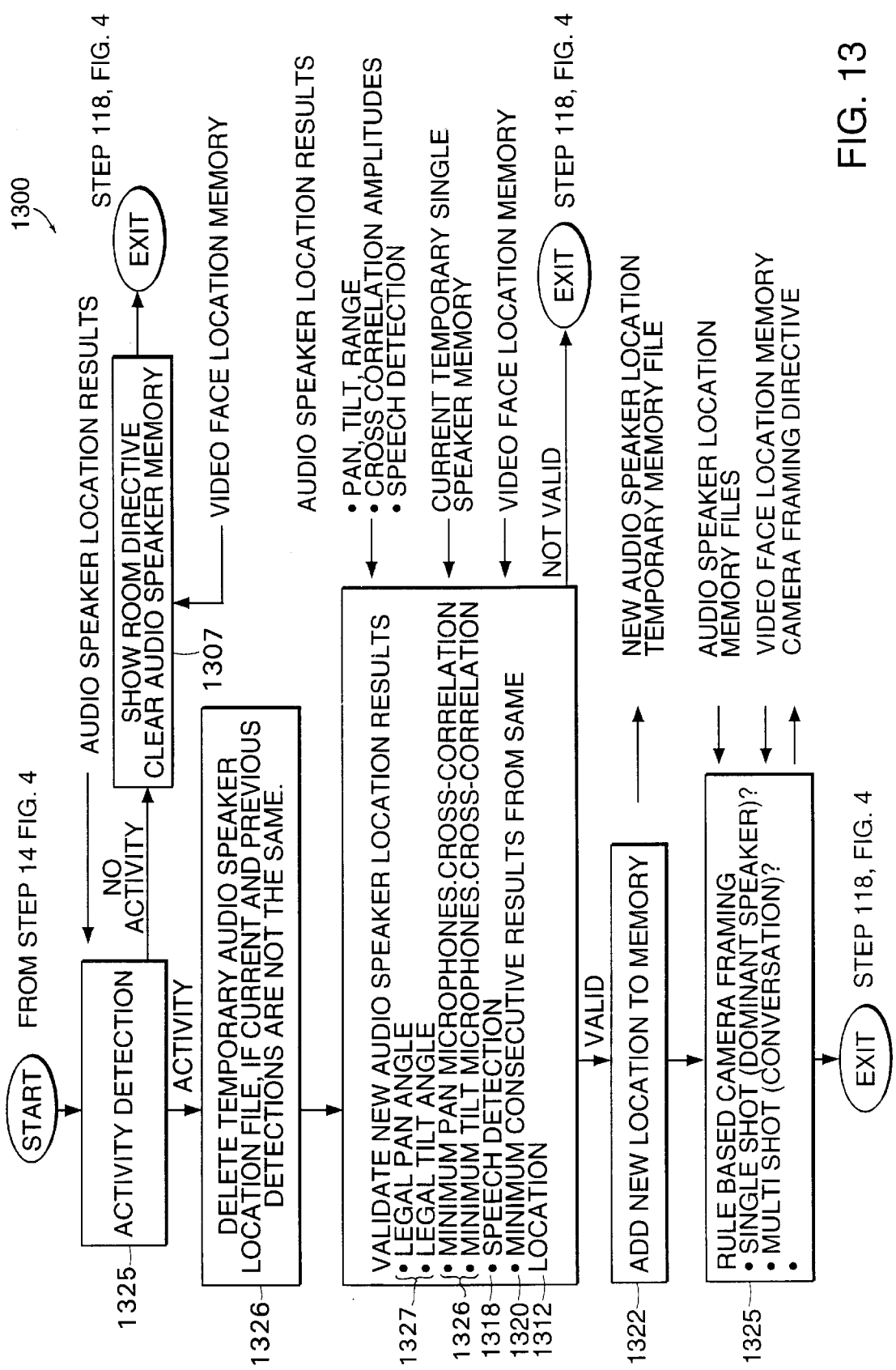
FIG. 13 shows a flow chart of the steps taken by a speaker validation and framing module.

After audio speaker location module 114 determines the location of a speaker, speaker validation and framing module 116 determines whether the detected speaker should be validated and how the camera shot for the detected speaker should be framed. FIG. 13 shows a flow chart 1300 of the steps taken by speaker validation and framing module 116. Briefly, speaker validation and framing module 116 first determines, based on a set of criteria, whether the results from audio speaker location module 114 (FIG. 4) represent a valid speaker location. The criteria for validating a detected speaker are as follows:

- a detection from the same location or the vicinity of the same location is made a predetermined number of times (reference number 1320 in FIG. 13);
- the pan and tilt values for the location of the audio speaker are those supported by camera 14 (reference number 1315 in FIG. 13);
- each of the normalized cross-correlation values is greater than a corresponding predetermined threshold value (reference number 1317 in FIG. 13); and
- the detected audio sequence was determined to have been speech (reference number 1318 in FIG. 13).

If a detected speaker location is validated, speaker validation and framing module 116 then uses a set of rules to ascertain an appropriate camera shot. In determining the appropriate camera shot, speaker validation and framing module 116 can use the data stored in the detected face (ref 110) files to frame the camera shot. Speaker validation and framing module 116 then supplies camera control module 80 with appropriate pan, tilt, and zoom directives.

The operation of speaker validation and framing module 116 will now be described in detail. In step 1305, speaker validation and framing module 116 first determines whether audio speaker location module 114 has detected an active audio source, which is a speaker for whom audio speaker location module 114 detects the onset of speech across a predetermined number of frequencies. If no active audio sources has been detected for a predetermined period of time, speaker validation and framing module 116 provides instructions to camera positioning device 16 to show a room shot (step 1307). Speaker validation and framing module 116 can in this step use the results of face detection stored in memory to frame an appropriate group shot, as will be described below.

Speaker validation and framing module 116 determines whether the detected location corresponds to the same location as the one detected immediately prior to the current detection. If not, speaker validation and framing module 116 deletes the temporary file associated with the previous detection (step 1310). If speaker validation and framing module 116 determines that an active audio source is detected, it then determines whether the detected speaker should be validated based on the above described criteria (step 1312). It should be noted that the threshold values used to determine whether to validate a detection (Ref 1312) can be changed based on the results of video based locator 60 stored in the detected face files, as described below. If the speaker location is not valid, speaker validation and framing module 116 finishes processing. If the speaker location is valid, speaker validation and framing module 116 stores the speaker location in a new temporary file (step 1322). In step 1325, based on the speaker location in the temporary file, and on a set of framing rules, speaker validation and framing module 116 selects an appropriate camera shot. For example, the camera shot can frame a single speaker or a group of speakers. A set of rules may, for example, indicate that if a speaker is the dominant speaker based on the number of times he or she has spoken recently, then the camera shot should only include him or her. The set of rules can also state that if two more or speakers have spoken recently, then the camera shot should include all participants in the conversation taking into account limitations of camera 14 for the available field of view. Additionally, speaker validation and framing module 116 can use the results of video based locator 60 to properly frame a camera shot, as will be described below. Based on this determination, speaker validation and framing module 116 provides camera control module 80 with camera framing instructions.

Referring back to FIG. 4, after validating a detected speaker, audio location memory module 118 either adds the new speaker to an existing speaker file to which the detected speaker was matched or creates a new speaker file. Such speaker files can store the speaker location and the number of times the speaker has spoken. Additionally, the speaker files are kept in order, with most recent speaker being at the top of the order. These files can be used for framing the camera based on some camera framing logic.

As described previously, audio-based locator 70 first uses the audio data to determine the location of the speaker and based on that determination supplies camera pointing control module 80 with directives as to how to move camera 14. Audio based locator 70 can also use results of video based locator 60 to appropriately frame a camera shot, as will be described in detail below. After the camera is moved, video based locator 60 captures frames of video images from camera 14 and detects the location of any faces in the video image. Camera pointing control module 80 then can use the results of both audio and video detection to adjust the tilt, pan, and range of camera 14 to correct for any errors in framing the camera, as will be described in detail below.

The manner in which camera control module 80 and speaker validation and framing module 116 use the detection results from video based locator 60 and audio based locator 70 to properly frame camera shots will now be described in detail. The manner in which camera control module 80 uses the face detection results to correct errors in camera positioning device 16 will first be described. Then, the manner in which speaker validation and framing module 116 uses the face detection results to supplement the results of audio speaker detection module 116 to prevent errors in camera pointing directives and to better frame camera shots will be described.

Figure 14:
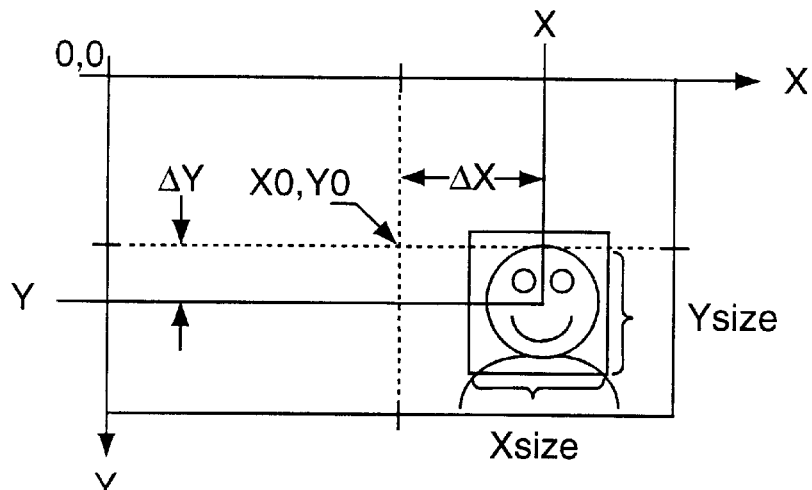
FIG. 14 illustrates an error in framing a camera shot due to a misalignment between the camera and a microphone array.

In some embodiments, one error for which camera control module 80 can correct is the error due to misalignment between camera 14 and microphone array 12. Generally, audio based locator 70 uses an array of microphones 12 to determine the location of a speaker relative to an audio reference point. The accuracy of this determination partly depends on the accuracy of the alignment of camera 14 with array of microphones 12 through camera positioning device 16. However, camera 14 and array of microphones 12 may be misaligned because of mistakes during the manufacturing process or as a matter of regular use of the system. Therefore, the camera pointing directives from audio based locator 70 can result in an image in which the speaker is offset from a desired position on the frame (for example, the center of the frame), as shown in FIG. 14.

Figure 15:
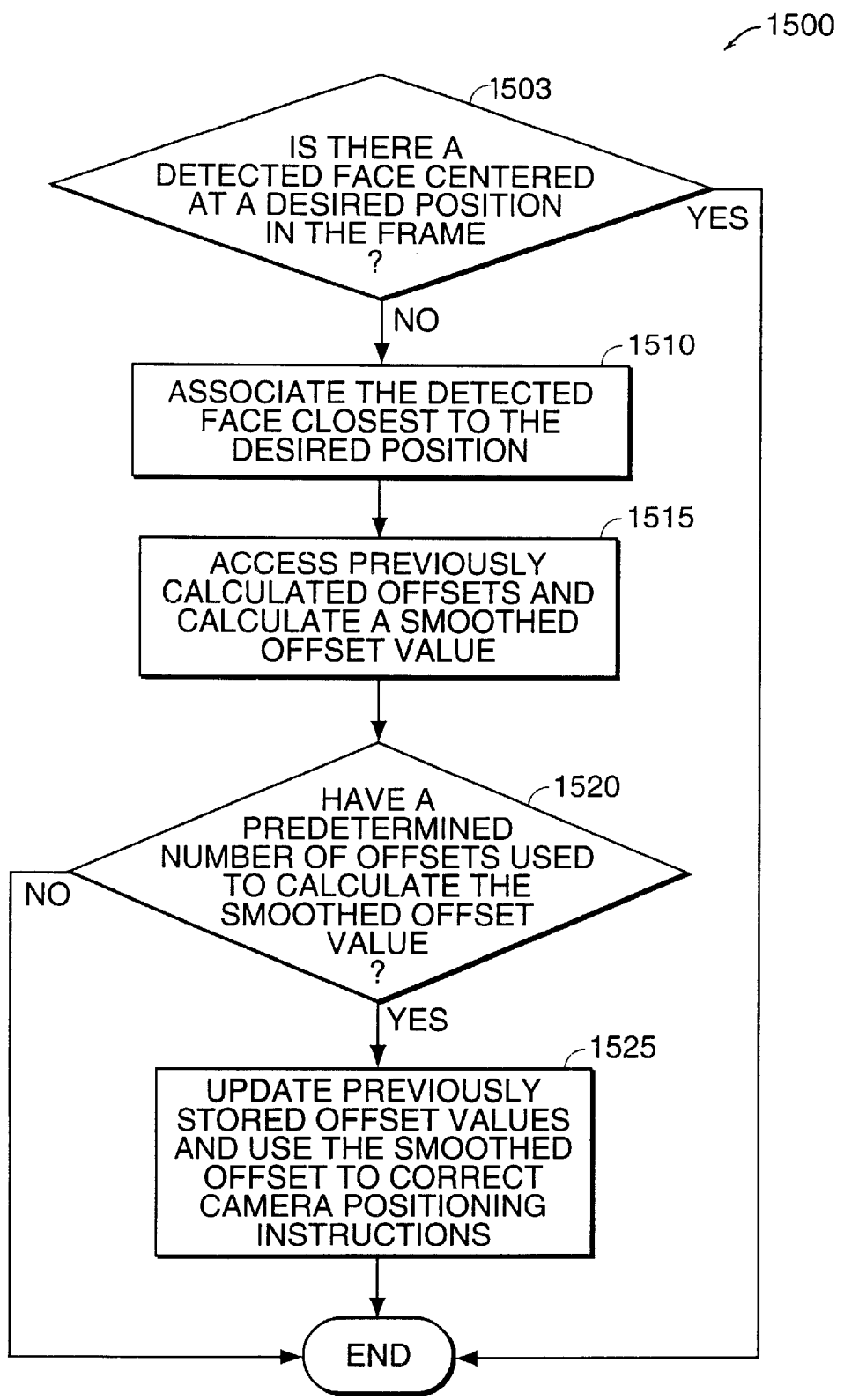
FIG. 15 shows a flow chart of the steps taken by a camera control module to correct for an error in framing a camera shot due to a misalignment between the camera and a microphone array.

Camera control module 80 uses the results of face detection from video based locator 60 to correct for the offset. FIG. 15 shows a flow chart 1500 of the steps taken by camera control module 80 to correct for the video offset. If a face is not located at a desired position in the captured video image (step 1505), video based locator 60 determines that the camera shot is not centered on the speaker. Video based locator 60 then determines which of the detected faces is located closest to the desired position in the captured video image and assumes that this face corresponds to the detected speaker (step 1510). Video based locator 60 calculates the amount by which the closest face is offset from the desired position. Video based locator 60 then accesses, in step 1515, the previously calculated offset values and calculates a smoothed offset value, for example, by averaging the values (step 1515). After a predetermined number of offset values are used to calculate the smoothed offset value (step 1520), the smoothed offset value is used to replace any previously stored smoothed offset values and the new value is used from now on to correct camera positioning instructions (step 1525). In some embodiments, video based locator 60 checks from time to time (for example, every time camera 14 is moved) whether the image is offset and recalculates the smoothed offset value.

In some embodiments, video based locator 60 calculates the offset values for a predetermined number of frames and then compares them to find a cluster of offset values which are close in value to one another. Video based locator 60 then calculates an offset value based on the cluster of offset values (for example, by averaging the values). In this manner, video based locator 60 filters out those offset values which resulted from other factors prior to sending them to camera control module 80.

Figure 16:
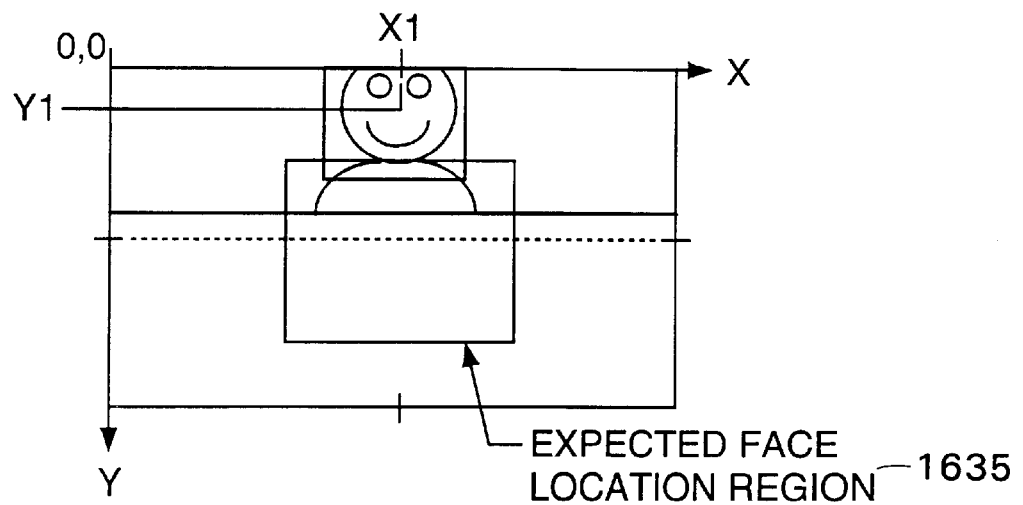
FIG. 16 illustrates an error in framing a camera shot due to a gross pointing error.

In some embodiments, audio speaker detection module 116 can correct for gross pointing errors, which are caused by the results from audio based locator 70 being incorrect for a variety of reasons. For example, audio based locator 70 can detect non-speech sounds as speech and therefore confuse a non-human acoustic source with a human speaker. Additionally, reflection from large surfaces such as walls and tables can confuse audio based locator 70 as to the true source of the audio. In these cases, audio based locator 70 may detect the source of the audio as the reflection point from the surface (for example, a table surface in front of the speaker). Additionally, if array of microphones 12 is performing tilt measurements, one tilt measurement microphone may receive acoustic waves mainly from the reflection point and while another may receive audio waves from the speaker. This can cause a significant error in the detected speaker location, resulting in the camera pointing below the reflection point or over the head of the speaker. Similar problems can occur in the pan dimension, although less frequently. In either the case of non-speech sources, or reflection, the error is manifested as a gross camera pointing error where camera 14 points to the non-speech acoustic source or the source of the reflection as shown in FIG. 16.

Figure 17:
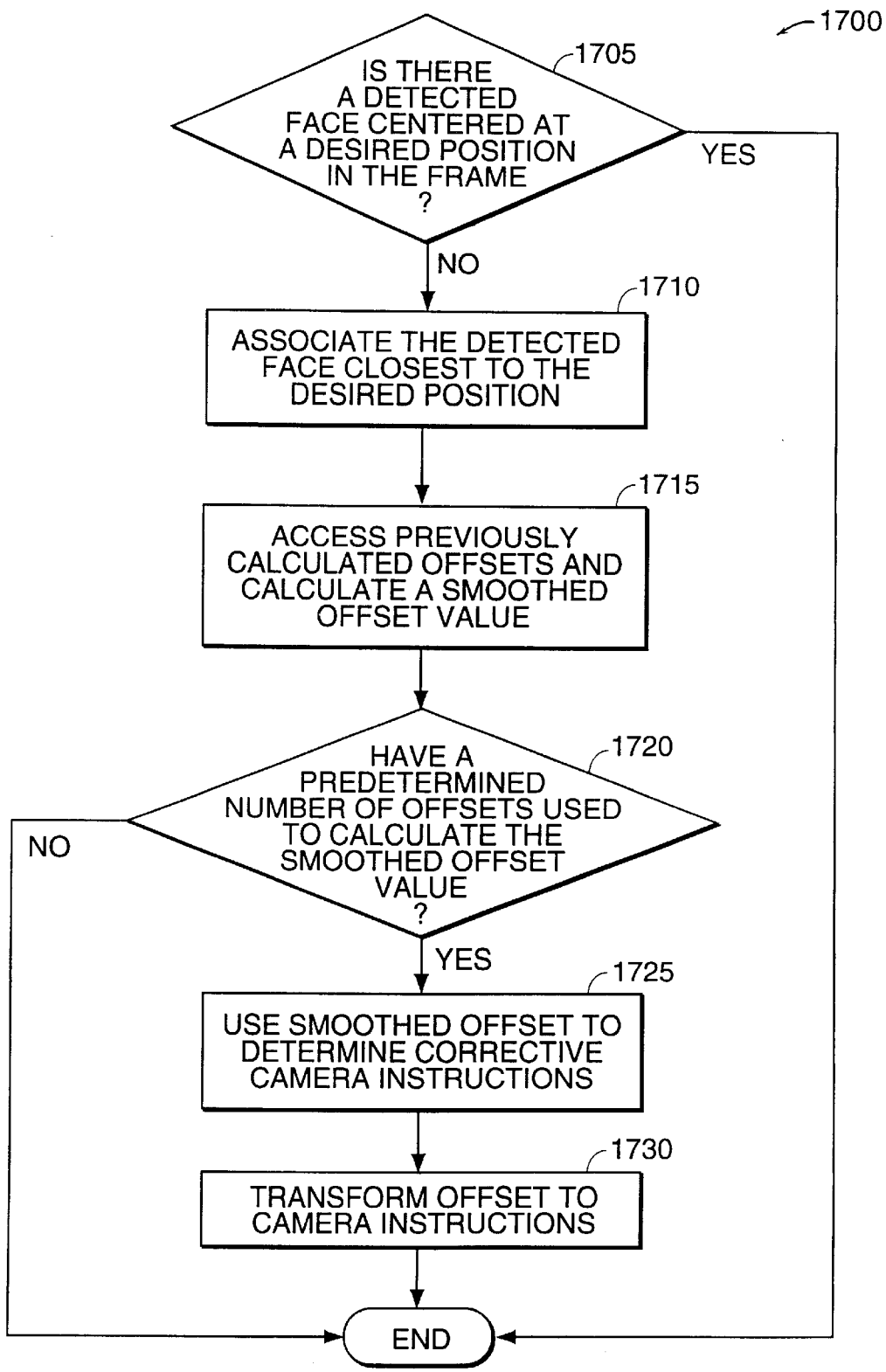
FIG. 17 shows a flow chart of the steps taken by a camera control module to correct for a gross pointing error.

FIG. 17 shows a flow chart 1700 of the steps taken by audio speaker and validation module 116 to correct for such gross pointing errors. Audio speaker and validation module 116 first determines whether a gross pointing error has occurred. To do so, audio speaker and validation module 116 determines whether a detected face is located in an area 1605 in the video frame (FIG. 16) where the image of the speaker's face is expected (step 1705). If a face is not located at a desired position (i.e. area 1605) of the captured video image (step 1705), video based locator 60 determines that the captured video image is not centered. Video based locator 60 then determines which of the detected faces is located closest to the desired position in the captured video image and assumes that this face corresponds to the detected speaker (step 1710). Video based locator 60 calculates the amount by which the closest face is offset from the desired position. Video based locator 60 then accesses, in step 1715, the previously calculated offset values and calculates a smoothed offset value, for example, by averaging the values (step 1715). After a predetermined number of offset values have been used to calculate the smoothed offset value (step 1720), the smoothed offset value is used to determine corrective camera instructions to compensate for any gross camera pointing errors (step 1725). Camera control module 80 then transforms this offset value into camera instructions which are provided to camera position device 16 (step 1730).

In some embodiments, audio speaker and validation module 116 can also use the data from video based locator 60 to correct errors in determining the distance from camera 14 to the speaker (that is, range finding errors). Generally, range is a difficult dimension for audio speaker source location systems to measure accurately. The accuracy of the measurement depends on at least two factors. The first factor is the size of the microphone array 12, where larger arrays yield more accurate results. The second factor is the duration and quality of the audio speech being processed, where longer durations and higher utterance counts yield more accurate results. Since the range value is used to zoom camera 14, errors in the value of the range can lead to errors in framing the speaker by making a camera shot either too tight or too wide, as shown in FIG. 18.

Figure 19:
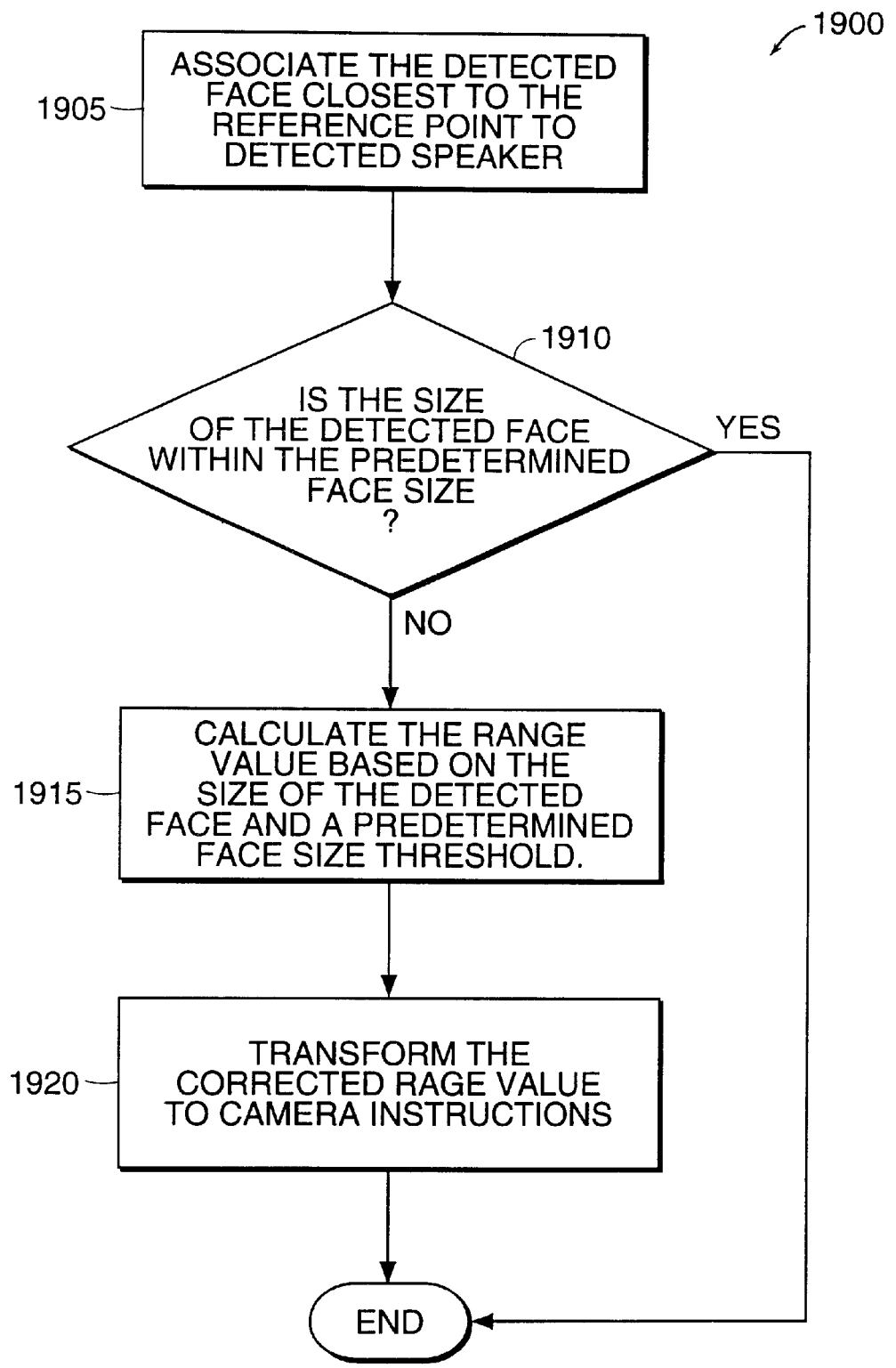
FIG. 19 shows a flow chart of the steps taken by a camera control module to correct for a range finding error.

FIG. 19 shows a flow chart 1900 of the steps taken by audio speaker and validation module 116 to correct for range finding errors. Audio speaker and validation module 116 first determines which of the detected faces is located closest to the expected position in the image and assumes that this face corresponds to the detected speaker (step 1905). If the size of the closest detected face is within a predetermined face size value, then audio speaker and validation module 116 assumes that the range is correct (step 1910). If not, audio speaker and validation module 116 computes a range value which would adjust the size of the detected face to fall within the predetermined face size threshold value (step 1915). Audio speaker and validation module 116 transforms this offset value into camera framing directives which are supplied to camera 14 and camera positioning device 16 (step 1920).

As stated above, speaker validation and framing module 116 (FIG. 4) can use the face detection results to appropriately frame a camera shot. In some embodiments, speaker validation and framing module 116 of audio based locator 70 can use the results from video based locator 60 to dynamically change the variables controlling the speaker validation process. Speaker validation and framing module 116 changes these variables to achieve two goals: prevent gross pointing errors and reduce the response time of camera 14 and video conferencing system 10.

Figure 20:
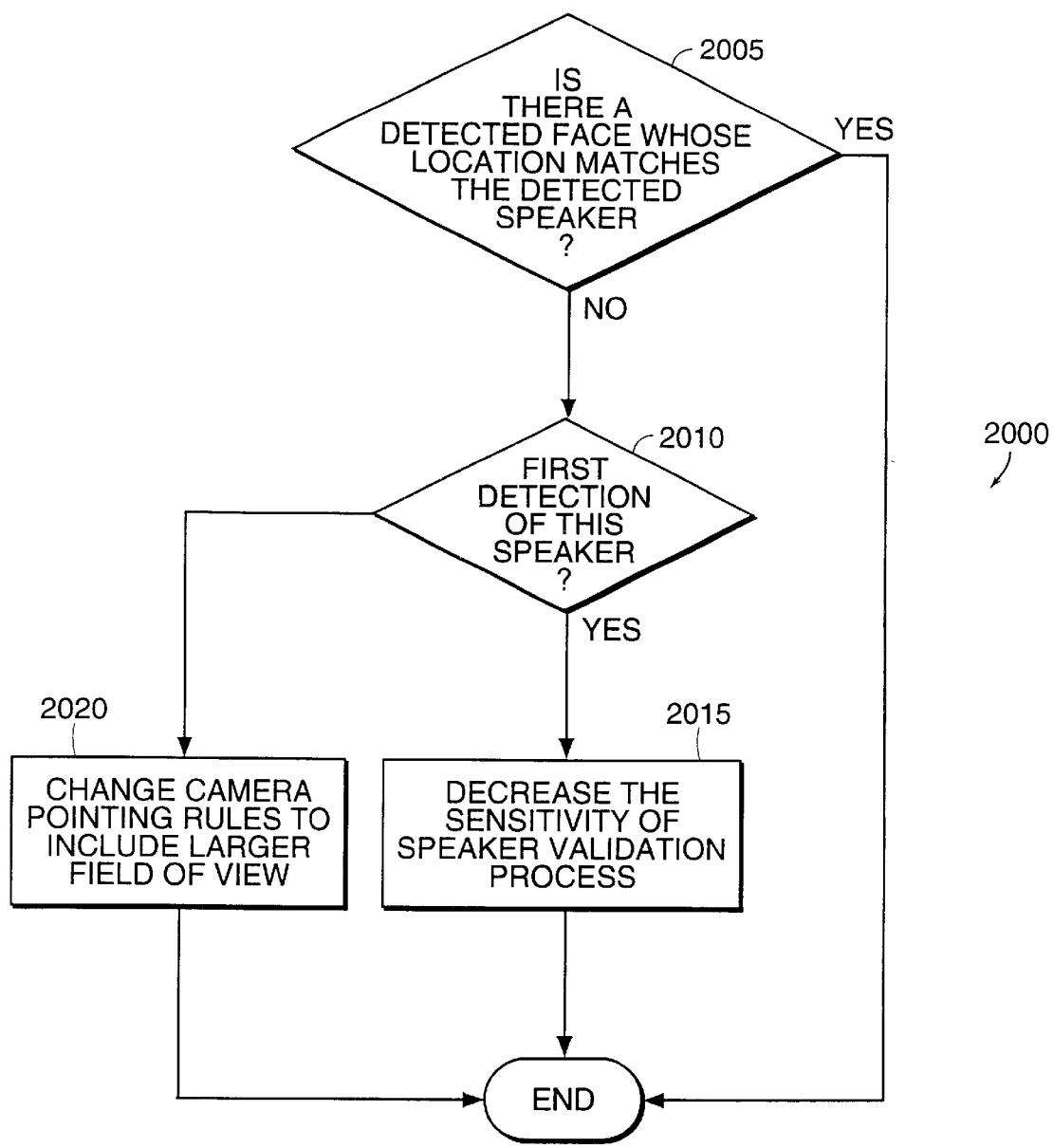
FIG. 20 shows a flow chart of the steps taken by a speaker validation and framing module to prevent gross pointing errors.

FIG. 20 shows a flow chart 2000 of the steps taken by speaker validation and framing module 116 to prevent gross pointing errors. Speaker validation and framing module 116 first determines whether the location of a previously detected face matches the location of the detected speaker (step 2005). If there is a matching detected face, then speaker validation and framing module 116 determines that the detected speaker is a valid speaker. However, if there is no matching detected face and this is the first detection of this speaker, speaker validation and framing module 116 decreases the sensitivity of the validation process so that there is less likelihood of validating the detected speaker (steps 2010–2015). To do so, speaker validation and framing module 116 increases three threshold values: the cross-correlation threshold value (1317 in FIG. 13), the number of consecutive detections of a speaker location before the speaker location is validated (1320 in FIG. 13), and the threshold value for speech detection (1318 in FIG. 13). By increasing these threshold values, speaker validation and framing module 116 reduces the likelihood of validating a speaker which does not match a detected face.

If after increasing the threshold values, speaker validation and framing module 116 still validates the speaker, then speaker validation and framing module 116 changes the camera framing rules to mitigate gross pointing errors (step 2020). Speaker validation and framing module 116 can change the rules in a number of ways: increasing the field of view to include a larger area, increasing the field of view to include a nearby detected face, or defaulting to a group shot which includes all detected faces.

Figure 21:
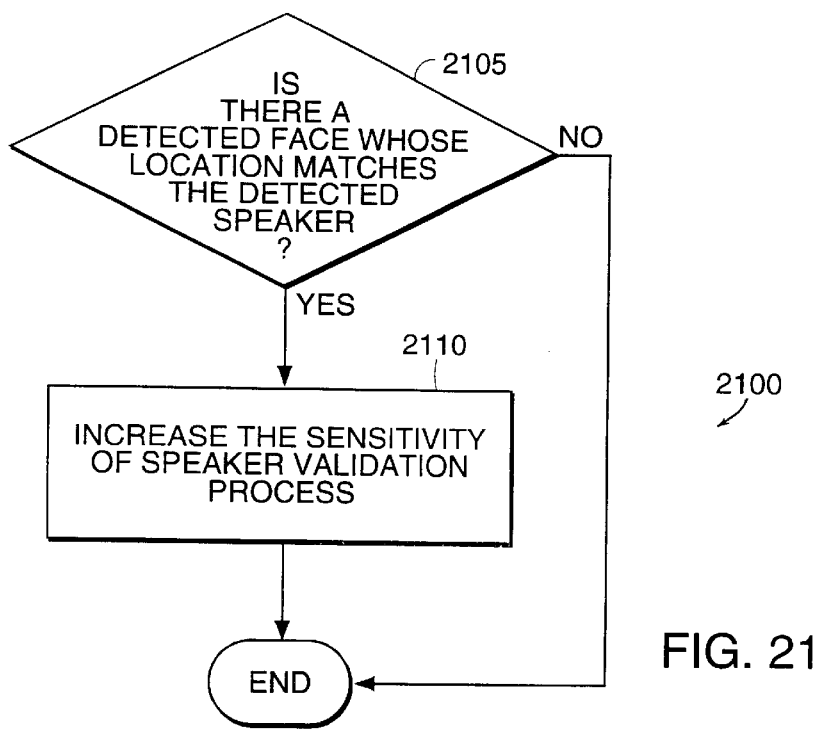
FIG. 21 shows a flow chart of the steps taken by a speaker validation and framing module to reduce the response time of the video conferencing system of FIG. 1.

FIG. 21 shows a flow chart 2100 of the steps taken by speaker validation and framing module 116 to reduce the response time of video conferencing system 10 for detecting speakers and pointing the camera. If the location of a previously detected face matches the location of the detected speaker (step 2105), then speaker validation and framing module 116 increases the sensitivity of the audio based locator 70 (step 2110). Therefore, the likelihood of detection and validating a speaker is increased. To do so, speaker validation and framing module 116 performs the following function: lowering the correlation threshold value (1317 in FIG. 13); lowering the required number of consecutive detections required of a speaker location before the speaker location is validated (1320 in FIG. 13); and lowering speech detection threshold value in audio speaker location module 114 in FIG. 4 (1318 in FIG. 13). This increases the number of validated detections from the speaker in audio based locator 70 and therefore results in faster response time. However, increasing the sensitivity of the speaker validation process increases the number of false positive speaker detections. Since the audio speaker is already matched against a detected face, the false positive detections are easily filtered out and therefore do not significantly, if at all, affect the performance of video conferencing system 10. Additionally, instead of audio range finding, speaker validation and framing module 116 can use the face detection results for range finding, further reducing the processing time, the required number of microphones, and the required accuracy of microphone mounting, which are typically required for performing audio speaker location module 114.

Figure 22:
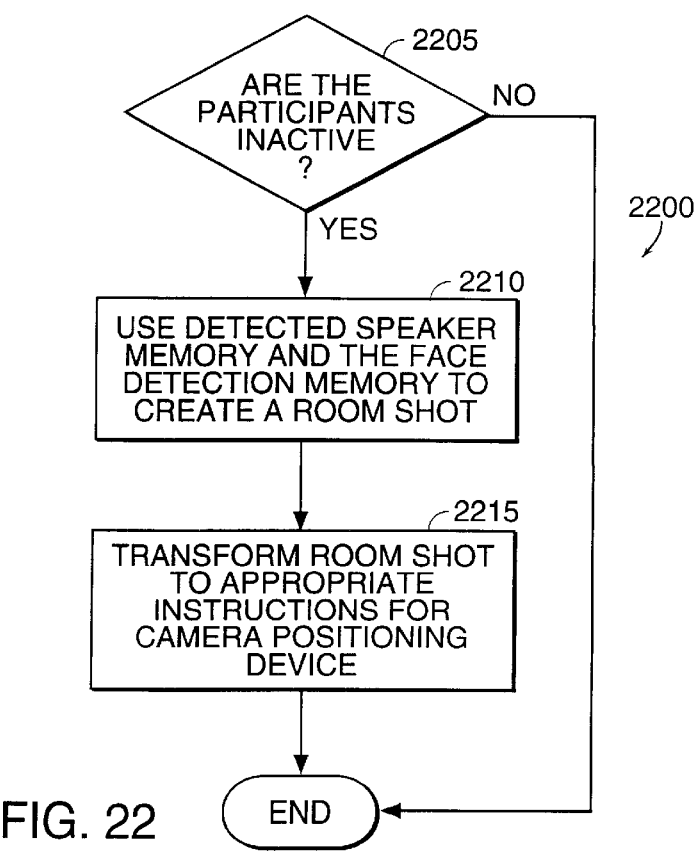
FIG. 22 shows a flow chart of the steps taken by a speaker validation and framing module to frame a group shot.

In some embodiments, speaker validation and framing module 116 uses the data from video based locator 60 to frame shots of all the participants in a meeting. FIG. 22 shows a flow chart 2200 of the steps taken by speaker validation and framing module 116 to frame a group shot. Generally, when framing such group shots, if speaker validation and framing module 116 only uses the results for those speakers detected based on audio signals, speaker validation and framing module 116 can only capture those participants who have spoken. Therefore, silent participants are left out of the group shot. However, by supplementing the audio based detected speakers with the data stored in the detected face files, speaker validation and framing module 116 can frame the camera to capture all participants in the group shot.

To frame the camera for such a group shot, speaker validation and framing module 116 first determines whether the participants have stopped speaking (step 2205) for a period of time. If so, speaker validation and framing module 116 uses the detected speaker files and the data stored in the detected face files to frame a group shot (step 2210). In some embodiments, speaker validation and framing module 116 first uses the detected speaker files to frame a group shot and then uses the data stored in the detected face files to adjust the group shot. The group shot preferably includes the most recently detected speaker based on audio. The group shot also preferably includes as many of the speakers which are detected based on the audio signals and as many of the faces detected based on the video signals as are possible given the pan, tilt, and zoom limitations of camera 14 and camera positioning device 16. Camera control module 80 transforms the adjusted room shot values into camera instructions which are provided to camera positioning device 16 (step 2215).

Figure 23A:
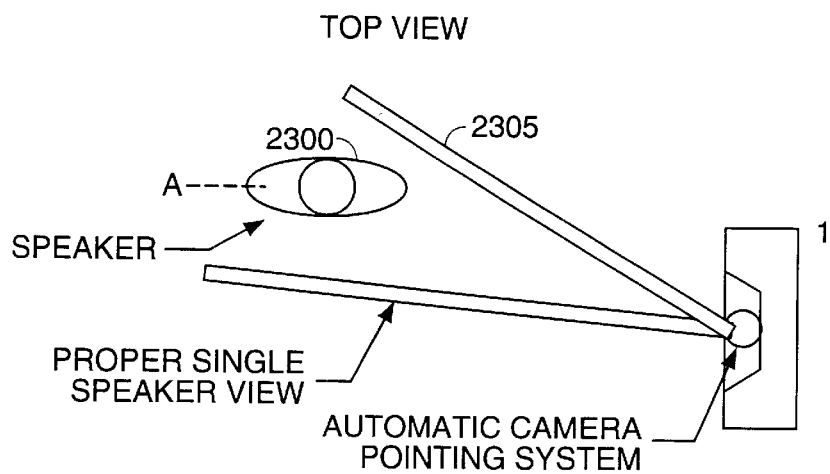
FIGS. 23A–C show top views of the position of a moving speaker relative to the field of view of a camera.
Figure 23B:
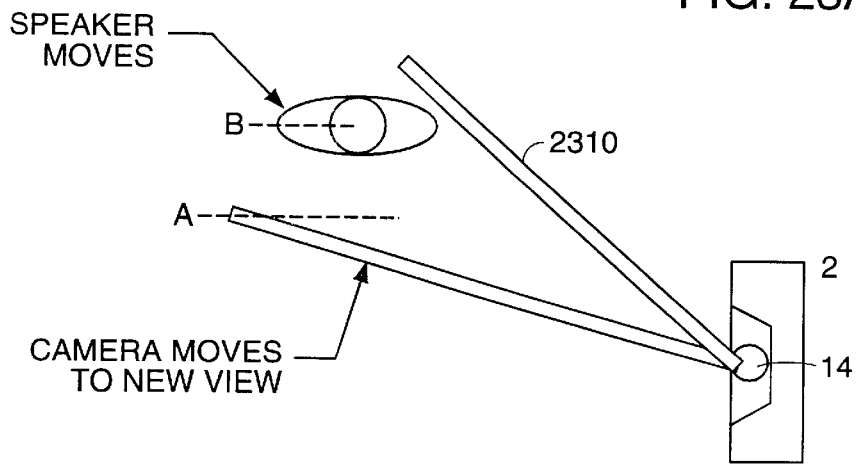
Figure 23C:
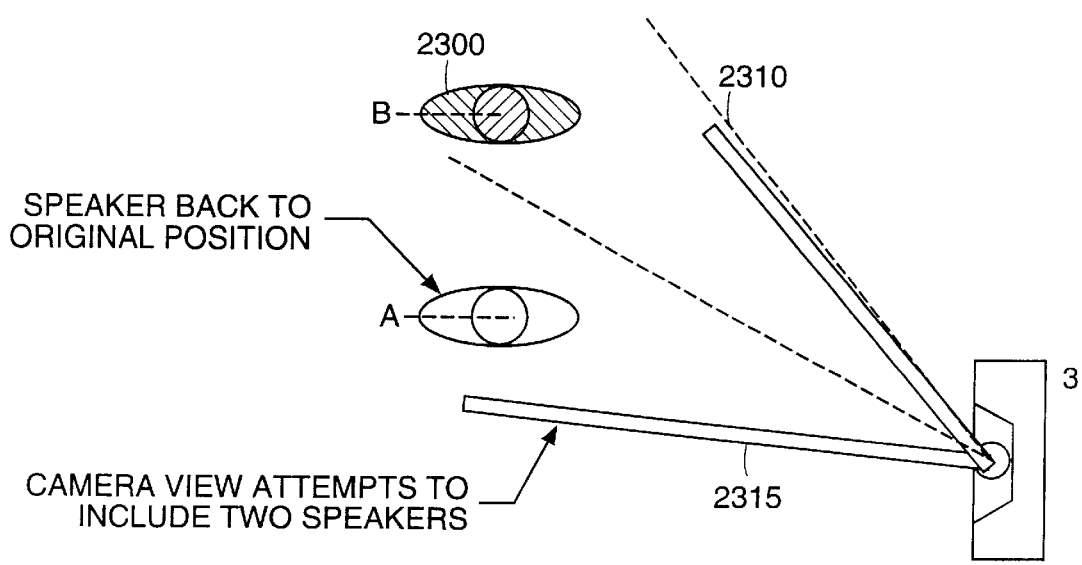

In some embodiments, speaker validation and framing module 116 uses the video track files to identify a moving speaker and then adjusts the field of view of camera 14 to better capture the moving speaker. FIGS. 23A, 23B, and 23C show top views of the position of a moving speaker 2300 relative to camera 14 and the field of view of camera 14. In FIG. 23A, speaker 2300 is stationary relative to camera 14. Camera 14, therefore, can capture an image of the speaker with a relatively narrow field of view 2305. However, referring to FIG. 23B, as the speaker moves from location A to location B, he or she moves out of field of view 2305 and into a field of view 2310. As he or she moves back to location A, speaker 2300 moves out of field of view 2310 and into field of view 2310. One method of ensuring that a proper image of the speaker is captured is for camera 14 to use a relatively broad field of view 2315. This has the advantage of avoiding continual camera movement to follow a moving speaker. Such continual camera movements can make the video images appear as discontinuous, especially when compressed for transmission over a telecommunication network.

Figure 24:
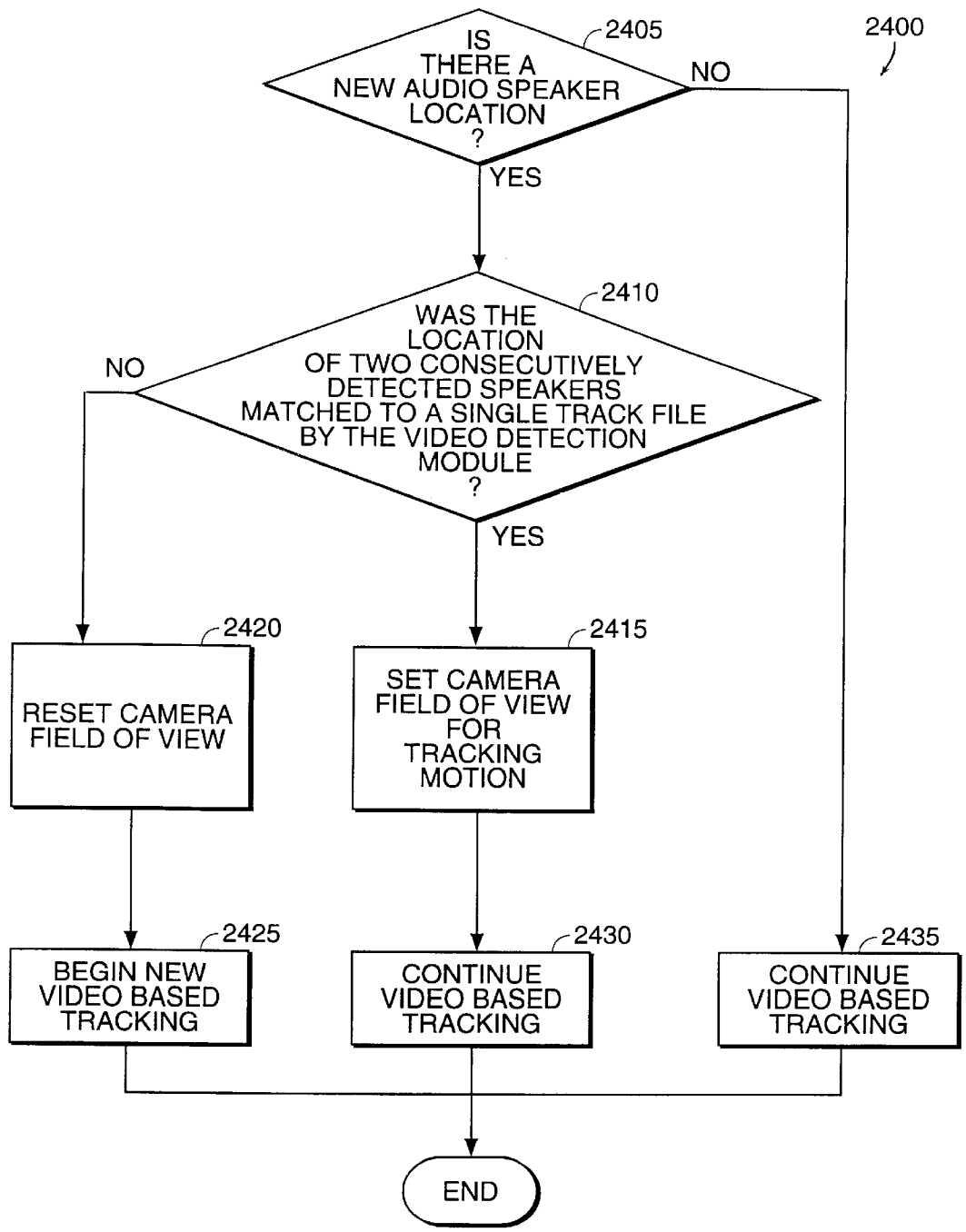
FIG. 24 shows a flow chart of the steps taken by a speaker validation and framing module to adjust the field of view of a camera for a moving speaker.

FIG. 24 shows a flow chart 2400 of the steps taken by speaker validation and framing module 116 to adjust the field of view of camera 14 for a moving speaker. Flow chart 2400 uses the video based tracking detected speakers, described in detail above. Generally, as a speaker moves, speaker validation and framing module 116 identifies the speaker as a newly detected speaker. If a new speaker is not detected, audio speaker validation and framing module 116 continues with video based tracking. However, if a new speaker location is detected (step 2405), speaker validation and framing module 116 checks to see if two consecutive speaker locations have been matched to a single track file by video based locator 60 (step 2410). If so, the speaker is assumed to be a moving speaker. Speaker validation and framing module 116 sets the camera for tracking a moving speaker by increasing the field of view of camera 14 to encompass both the previous location and the current location of the speaker (that is, zoom out camera 14) (step 2415). As long as there are two consecutive matches, camera 14 will have the broad field of view and video based tracking continues (step 2430). However, if there are no consecutive matches, camera 14 is reset and returned to its original field of view. (step 2420). In that case, the video based tracking is reset and starts anew (step 2425).

Other embodiments are within the scope of the following claims.

Figure 25:
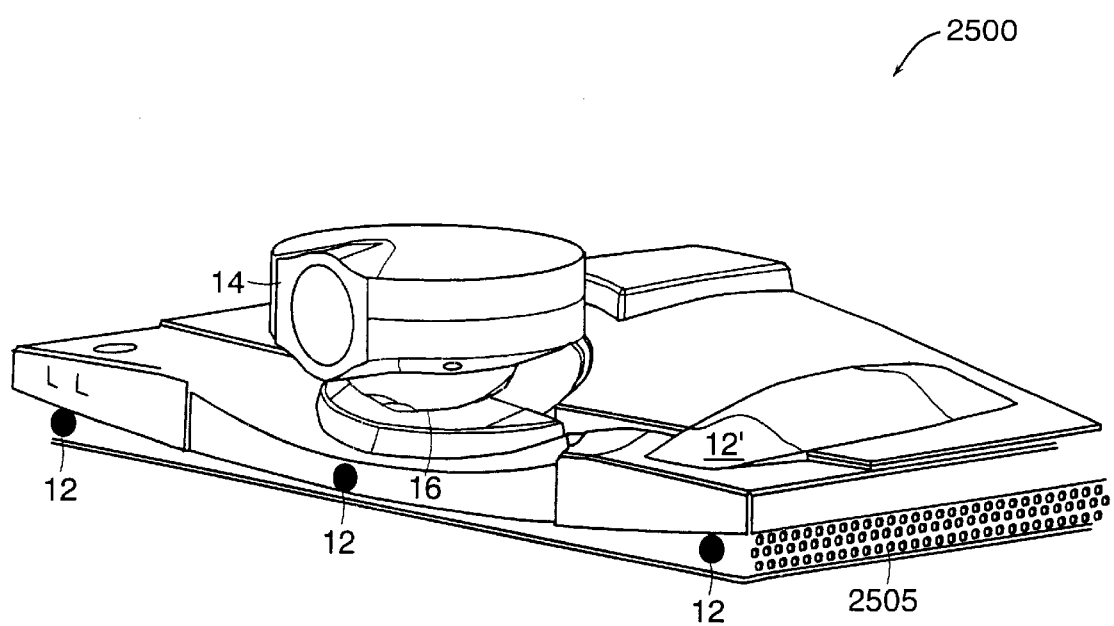
FIG. 25 shows an alternative embodiment of a video conferencing system.

For example, FIG. 25 shows an integrated, portable video conferencing system 2500. Video conferencing system 2500 is portable and integrated in a similar manner as video conferencing system 10 and can have similar features, design, and construction as video conferencing systems described in the commonly assigned U.S. patent application "Integrated Portable Videoconferencing," application Ser. No. 08/694,324, filed on Nov. 5, 1997, incorporated in its entirety by reference. In addition, video conferencing system 2500 has substantially similar components as video conferencing system 10, except to the extent described here. In FIG. 25 components having the same reference numeral as those in previous Figs. (such as FIG. 1) have been previously described and will not be described here. It should be noted that video conferencing system 2500 also includes a directed microphone array 12', such as those described in U.S. Ser. No. 08/657,636, filed May 30, 1996, and issued as U.S. Pat. No. 5,715,319, contents of which are incorporated herein in their entirety by reference.

Video conferencing system 2500 can be operated in two modes of operation. In its first mode of operation, audio based locator 70 of video conferencing system 10 provides camera positioning directives for panning the camera as described above. In this mode of operation, video based locator 60 does not perform any functions. In some embodiments, this mode of operation is the only mode of operation of video conferencing system 2500 and video based locator 60 is not included in video conferencing system 2500.

In a second mode operation, audio based locator 70 provides instructions for panning camera 14 while speaker validation and framing module 116 uses the data from video based locator 60 to tilt camera 14. By processing video signals to provide tilt information, video conferencing system 2500 does not require microphones for providing tilt information (such as microphones 12C and 12D in FIG. 1). Since at least one microphone for tilt must be offset from the plane in which the pan microphones lie, by eliminating the need for tilt microphones, video conferencing system 2500 can be implemented as a limited dimension system and also be designed to be portable.

In video conferencing system 2500, video based locator 60 can use an alternative method of face detection in video face location module 102 (FIG. 4), which will now be described. Referring to FIG. 4, in these embodiments, video face location module 102 detects the upper contour of moving objects in the video frames, which in most cases are humans, using luma values only (although in other embodiments chroma values may also be used). Since contour detection is not as computationally intensive as the previously described face detection technique and uses luma values only, it is particularly suitable for applications where the underlying system does not have significant processing power. This has the advantage of enabling designing integrated, portable and less expensive video conferencing systems.

Figures 26, 26A:
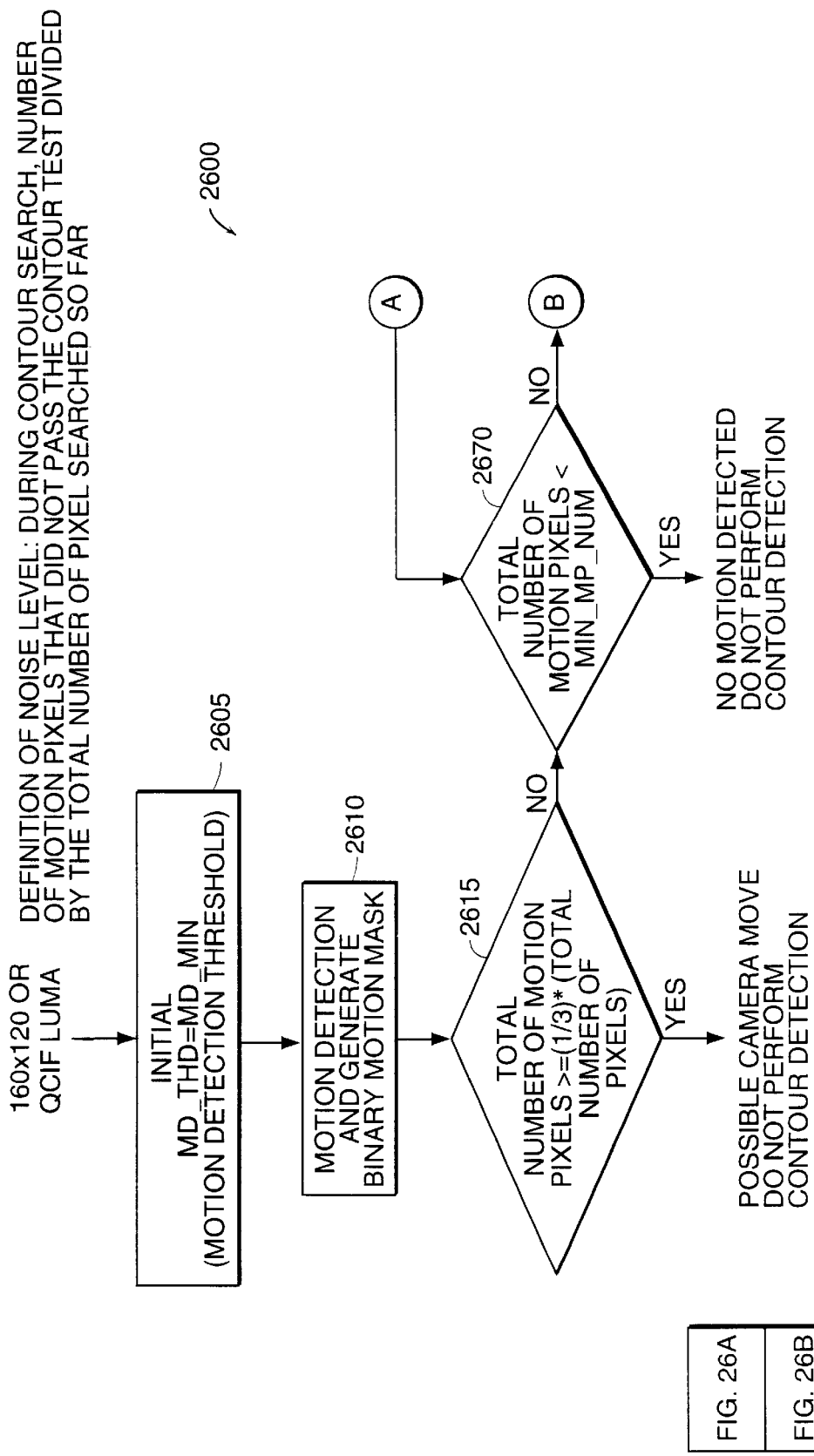
FIG. 26 is a flow chart of detailed steps performed by a video face location module to detect contours of speaking persons.
Figure 26B:
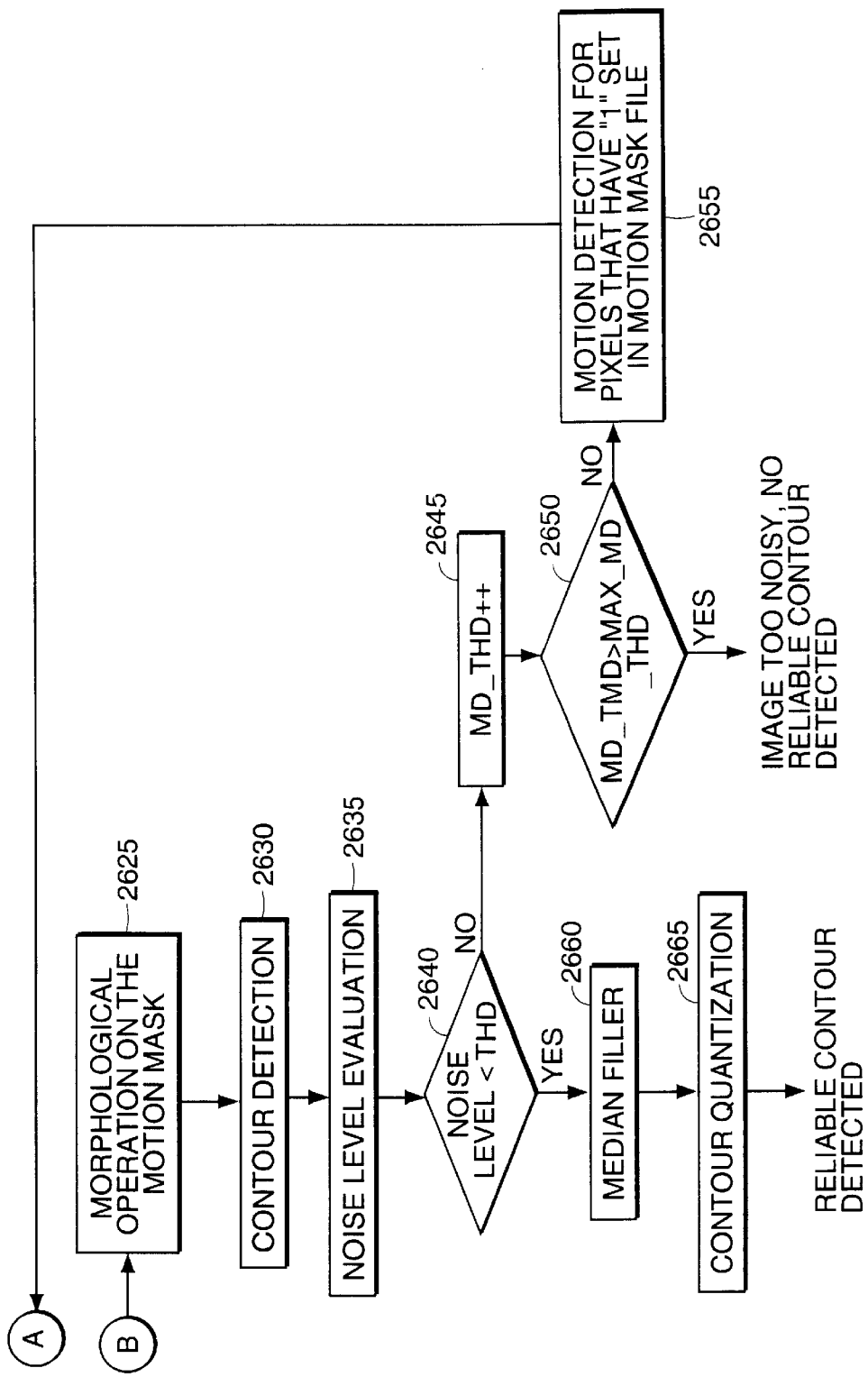

FIG. 26 shows a flow chart 2600 of the steps taken by video face location module 102 to detect contour of speakers using an adaptive contour detection technique. In step 2605, after retrieving a new and a previous video frame, video face location module 102 first initialize an adaptive motion detection threshold (MD_THD) by setting it to have a minimum initial value (MD_THD_MIN). The adaptive motion detection threshold is used in detecting the motion pixels in the captured video frames. Video face location module 102 processes current and previous video frames to detect the motion pixels in the current video frame in order to generate a binary motion map (or mask) in a similar manner as described previously in reference to flow chart 700 in FIG. 7 (step 2610). It should be noted, however, that here only luma values are used.

If the total number of motion pixels in the binary motion map is more than a predetermined proportion, here one third, of the total number of pixels in the video frame (step 2615), then video face location module 102 determines that the detected motion pixels are due to a camera move. If the total number of motion pixels in the binary motion map is not more than the predetermined proportion of the total number of pixels in the video frame (step 2615), then video face location module 102 determines whether the total number of motion pixels is less than a predetermined threshold (MIN_MP_NUM) (step 2620). If so, video face location module 102 determines that the number of motion pixels are less than that typically expected from a frame having an image of a moving person.

However, if video face location module 102 determines whether the total number of motion pixels is not less than a predetermined threshold (MIN_MP_NUM) (step 2620), then video face location module 102 performs a morphological operation on the binary motion map to fill any pixels which are detected to be static but are surrounded by motion pixels (step 2625). The morphological operation can, for example, be a 3×3 operator dilation and erosion operation.

Video face location module 102 then detects the contours of the shapes in the binary motion map (step 2630). The contour detection proceeds as follows. In each column, from top to bottom, video face location module 102 evaluates each moving pixel by looking at the 5×5 pixel block to the lower left or lower right of the pixel. If there are more than 6 moving pixels in either block, video face location module 102 identifies the pixel as a contour pixel. Since the contours are used for providing camera directives for tilting camera 14, only the upper contours of the detected persons are needed. Hence, as soon as video face location module 102 encounters a contour pixel in a column, video face location module 102 finishes analyzing that column.

Video face location module 102 then calculates the noise level (step 2635). The noise level is defined as the total number of noise pixels divided by the total number of pixels above the detected contours. Noise pixels are motion pixels in the binary motion map which are above the detected contours, that is, motion pixels which are assumed not to correspond to any human speaker. If the noise level is not below a predetermined noise threshold (step 2640), then it is determined that a less sensitive motion detection is to be performed on the frame to reject motion pixels detected because of noise. The motion detection to be performed is less sensitive in the sense that the likelihood of detecting motion pixels is decreased. To do so, video face location module 102 increases the adaptive motion detection threshold by a predetermined value (step 2645). If the adaptive motion detection threshold is more than a maximum allowable noise threshold value (step 2650), then video face location module 102 determines that the noise level is above a level where reliable contour can be detected.

If the adaptive motion detection threshold is not more than the maximum allowable noise threshold value (step 2650), then video face location module 102 performs a new motion detection on the motion pixels in the binary motion map using the new value of the adaption motion detection threshold (step 2655). This process likely reclassifies some of the motion pixels as non-motion pixels.

At this point steps 2620–2655 are repeated until either the maximum allowable noise threshold value is reached (step 2650) or the detected noise level is below the predetermined noise threshold (step 2640).

If the noise level is below the predetermined threshold (step 2640), then it is assumed that the noise level is sufficiently low that a reliable contour can be detected. Video face detection module 102 then applies a five point median filter to smooth out the contour and to further filter out any motion pixels detected due to noise (step 2660). Then, in step 2665, to reduce the amount of stored data, video location module 102 quantizes the detected contours (for example, to 16 levels).

Speaker validation and framing module 116 (FIG. 4) then uses this information to determine an appropriate tilt angle and supplies camera positioning device 16 with appropriate directives. To do so, speaker validation and framing module 116 selects the highest contour point and determines how camera 14 should be tilted so that this highest contour point is located at a predetermined position in the captured video images.

In some embodiments, other methods of face detection such as neural net or color histogram distribution based face detection algorithms and techniques can be used for determining the location of faces of persons in video face location module 102.

It should be noted that in the above described embodiments, before modifying the camera framing directives based on the results of video detection module 60, camera pointing control 80 or speaker validation and framing module 116 first analyzes a predetermined number of frames. The values for all those frames are then validated to ensure that erroneous corrections are not performed. After the results are validated, they can then be used to modify the camera framing. In this manner, the accuracy of the framing modifications is increased.

What is claimed is:

1. A system comprising:
   an image pickup device generating image signals representative of an image;
   an audio pickup device generating audio signals representative of sound from an audio source;
   an audio based locator for processing the audio signals to determine a direction of the audio source relative to a reference point;
   a video based locator including a video face location module that processes the image signals for pixels having flesh tone colors to identify an object in the direction of the audio source; and a pointing control that steers the image pickup device to frame the object in the direction of the audio source.

2. The system of claim 1 further comprising an integrated housing for an integrated video conferencing system incorporating the image pickup device, the audio pickup device, the audio based locator, the video based locator, and the pointing control.

3. The system of claim 2 wherein the integrated housing is sized for being portable.

4. The system of claim 1 wherein the image pickup device includes a positioning device for positioning said image pickup device, wherein the audio source locator supplies control signals to the positioning device for positioning the image pickup device, the control signals being generated based on the determined direction of the audio source.

5. The system of claim 4 wherein the image pickup device is capable of variable zoom and the audio source locator supplies control signals to the image pickup device for varying the zoom of image pickup device.

6. The system of claim 1 wherein the image signals represent frames of video images and the audio source is a speaking person, the audio source locator detecting an image of the face of the speaking person in one of the frames of video.

7. The system of claim 6 wherein the audio source locator detects the image of the face of the speaking person by detecting the speaking person based on the audio signals, detecting images of the faces of a plurality of persons based on the video signals, and correlating the detected images to the speaking person to detect the image of the face of the speaking person.

8. The system of claim 6 wherein the audio source locator determines the direction of the face relative to the reference point.

9. The system of claim 6 wherein the audio source locator detecting an image of the face of the speaking person in one of the frames of video includes detecting a region representing a moving face.

10. The system of claim 6 wherein the audio source locator detecting an image of the face of the speaking person in one of the frames of video includes detecting a region having flesh tone colors in the frames of video.

11. The system of claim 10 wherein the audio source locator detecting an image of the face of the speaking person in one of the frames of video includes determining whether size of the region having flesh tone colors corresponds to a pre-selected size, the pre-selected size representing size of a pre-selected standard face.

12. The system of claim 10 wherein the audio source locator detecting an image of the face of the speaking person in one of the frames of video includes determining the region having flesh tone colors does not corresponds to an image of a face, if the region having flesh tone colors corresponds to a flesh tone colored object.

13. The system of claim 1 wherein the audio source locator determines the direction based on the audio based direction and the video based location of the image.

14. The system of claim 13 wherein audio based locator determines an offset of the video based location of the image from a pre-determined reference point in said one of the frames of video and modifying the audio based direction, based on the offset to determine the direction.

15. The system of claim 13 further comprising a memory unit storing a previously determined offset of a video based location of an image in a previous one of the frames of video from a pre-determined reference point, wherein the audio source locator modifies the audio based direction, based on the stored offset, to determine the direction.

16. The system of claim 6 wherein the speaking person moves relative to the reference point, the audio source locator detecting the movement of the speaker and, in response to the movement, causing an increase in the field of view of the image pickup device.

17. The system of claim 1 wherein the audio source locator correlates the audio based direction to a video based location of the image in one of the frames of video and modifies the audio based direction, based on the results of said correlation, to determine the direction.

18. The system of claim 1 further comprising a memory unit for storing a previously determined direction of an audio source based on the audio signals and a previously determined video based location of an image of a face of a non-speaker person in a previous one of the frames of video, wherein the audio source locator uses the stored direction and video based location to cause an adjustment in the field of view of the image pickup device to include, in the field of view, the audio source and previously determined video based location.

19. The system of claim 1 further comprising:

a positioning device for positioning said image pickup device, wherein the audio source locator supplies control signals to the positioning device for positioning the image pickup device, the control signals including signals, based on the audio based direction, for causing said positioning device panning said image pickup device and signals, based on the video based location, for tilting said image pickup device.

20. The system of claim 1 wherein the video based locator determines a video based location of the image by determining, in part or in whole, a contour of the image.

21. The system of claim 20 wherein the video based locator uses a parameter in detecting the contour of the image, wherein changing the parameter in one direction increases a likelihood of detecting contours of images and changing that parameter in another direction decreases the likelihood, and the video based locator changes the parameter, when detecting the contour of the image, to increase or decrease the likelihood.

22. The system of claim 21 wherein the video based locator determines a noise level wherein an increase in the noise level decreases the likelihood of detecting contours of persons in images, wherein video based locator changes the parameter based on the noise level.

23. The system of claim 20 wherein the video based locator detects a region representing a moving person and determines, in part or in whole, a contour of an image of the moving person.

24. The system of claim 1 further comprising a memory unit for storing a video based location of an image in a previous one of the frames of video, wherein the audio based locator correlates the audio based direction of the audio source with the stored video based location of the image in the previous one of the frames of video to determine whether the image in the previous one of the frames of video corresponds to the audio source, and audio based locator uses the audio based direction in producing control signals for the image pickup device, only if the audio based locator determines that the image in the previous one of the frames of video corresponds to the audio source.

25. The system of claim 1 wherein the audio based locator detects a plurality of audio sources and uses a parameter to determine whether to validate at least one of the plurality of audio sources to use in producing control signals for the image pickup device, wherein changing the parameter in one direction increases a likelihood of audio based locator validating said at least one of the plurality of audio sources and changing that parameter in another direction decreases the likelihood, and wherein the audio based locator correlates the audio based direction of the audio source with the stored video based location of the image in one of the frames of video to determine whether the image in the one of the frames of video corresponds to the audio source, and if the image in the one of the frames of video corresponds to the audio source, the audio based locator changes the parameter in the one direction.

26. The system of claim 25 wherein if the image in the one of the frames of video fails to correspond to the audio source, the audio based locator changes the parameter in the another direction.

27. The system of claim 1 wherein the audio based locator correlates the audio based direction of the audio source with the video based location of the image in one of the frames of video to determine whether the image corresponds to the audio source, and if the audio based locator determines that the image fails to correspond to the audio source, the audio based locator causes an adjustment in the field of view of said image pickup device to include, in the field of view, the audio source and the video based location of the image in the one of the frames of video.

28. The system of claim 1 wherein the location is characterized by the direction of the audio source relative to the reference point and a distance, determined by the audio source locator, from the reference point to the audio source.

29. The system of claim 28 wherein the image signals represent frames of video images, the audio based locator determines an audio based distance from the reference point to the audio source based on the audio signals, the video based locator determines a video based distance from the reference point to the audio source based on an image of the audio source in one of the frames of video, and the audio source locator determines the distance based on the audio based distance and the video based distance.

30. A method comprising the steps of:

generating, at an image pickup device, image signal representative of an image;

generating audio signals representative of sound from an audio source;

processing the audio signals to determine a direction of the audio source relative to a reference point;

processing the image signals to identify an object in the direction of the audio source;

processing the image signals for pixels having flesh tone colors; and steering the image pickup device to frame the object in the direction of the audio source.

31. The method of claim 30 further comprising varying a field of view of the image pickup device to frame the object.

32. The method of claim 30 wherein the image signals represent frames of video images, and the audio source is a speaking person, the method further comprising the step of detecting an image of the face of the speaking person in one of the frames of video.

33. The method of claim 32 wherein detecting the image of the face of the speaking person further comprises the steps of:

detecting the speaking person based on the audio signals, detecting images of the faces of a plurality of persons based on the video signals, and correlating the detected images to the speaking person to detect the image of the face of the speaking person.

34. The method of claim 32 further comprising the step of determining the direction of the face relative to the reference point.

35. The method of claim 32 wherein detecting an image of the face of the speaking person in one of the frames of video includes detecting a region representing a moving face.

36. The method of claim 32 wherein detecting an image of the face of the speaking person in one of the frames of video includes detecting a region having flesh tone colors in the frames of video.

37. The method of claim 36 wherein detecting an image of the face of the speaking person in one of the frames of video includes determining whether size of the region having flesh tone colors corresponds to a pre-selected size, the pre-selected size representing size of a pre-selected standard face.

38. The method of claim 36 wherein detecting an image of the face of the speaking person in one of the frames of video includes determining the region having flesh tone colors does not corresponds to an image of a face, if the region having flesh tone colors corresponds to a flesh tone colored object.

39. The method of claim 30 wherein processing the image signals and audio signals further includes determining the direction based on the audio based direction and the video based location of the object.

40. The method of claim 30 wherein processing the image signals and audio signals further includes determining an offset of the video based location of the object from a pre-determined reference point in said one of the frames of video, and modifying the audio based direction, based on the offset, to determine the direction.

41. The method of claim 30 wherein processing the image signals and audio signals further includes modifying, based on a previously determined offset of a video based location of an image in a previous one of the frames of video from a pre-determined reference point, the audio based direction to determine the direction.

42. The method of claim 30 wherein the object is a speaking person that moves relative to the reference point, and wherein processing the image signals and audio signals further includes:

detecting the movement of the speaking person, and causing, in response to the movement, an increase in the field of view of the image pickup device.

43. The method of claim 30 wherein processing the image signals and audio signals further includes:

correlating the audio based direction to a video based location of an image in one of the frames of video, and modifying the audio based direction, based on the results of said correlation, to determine the direction.

44. The method of claim 30 wherein processing the image signals and audio signals further includes using a previously determined direction of an audio source based on the audio signals and a previously determined video based location of an image of a face of a non-speaker person in a previous one of the frames of video to cause an adjustment in the field of view of the image pickup device to include, in the field of view, the audio source and previously determined video based location.

45. The method of claim 30 further comprising the step of supplying control signals, based on the audio based direction, for panning said image pickup device and signals, based on the video based location, for tilting said image pickup device.

46. The method of claim 45 wherein determining a video based location of the object includes determining, in part or in whole, a contour of the image.

47. The method of claim 46 wherein a parameter is used in detecting the contour of the image, wherein changing the parameter in one direction increases a likelihood of detecting contours of images and changing that parameter in another direction decreases the likelihood, the method further comprising the step of:
changing the parameter, when detecting the contour of the image, to increase or decrease the likelihood.

48. The method of claim 47 further comprising the steps of
determining a noise level, wherein an increase in the noise level decreases the likelihood of detecting contours of persons in images, and
changing the parameter based on the noise level.

49. The method of claim 45 wherein determining a video based location of the object includes: detecting a region representing a moving person, and determining, in part or in whole, a contour of an image of the moving person.

50. The method of claim 30 wherein processing the image signals and audio signals further includes:
correlating the audio based direction of the audio source with a video based location of an image in a frame of video to determine whether the image in the frame of video corresponds to the audio source, and
using the audio based direction in producing control signals for the image pickup device, only if the image in the frame of video is determined to corresponds to the audio source.

51. The method of claim 30 wherein processing the image signals and audio signals further includes:
detecting a plurality of audio sources,
using a parameter to determine whether to validate at least one of the plurality of audio sources to use in producing control signals for the image pickup device, wherein changing the parameter in one direction increases a likelihood validating said at least one of the plurality of audio sources and changing that parameter in another direction decreases the likelihood,
correlating the audio based direction of the audio source with a video based location of an object in a previous one of the frames of video to determine whether the object in the previous one of the frames of video corresponds to the audio source, and
changing the parameter in the one direction, if the object in the previous one of the frames of video corresponds to the audio source.

52. The method of claim 32 wherein processing the image signals and audio signals further includes: correlating the audio based direction of the audio source with a video based location of an object in a previous one of the frames of video to determine whether the object corresponds to the audio source, and if the object fails to correspond to the audio source, causing an adjustment in the field of view of said image pickup device to include, in the field of view, the audio source and the video based location of the object in the previous one of the frames of video.

53. The method of claim 32 wherein the location is characterized by the direction of the audio source relative to the reference point and a distance, determined by the audio source locator, from the reference point to the audio source.

54. The method of claim 53 wherein the image signals represent frames of video images, the method further comprising:
determining a audio based distance from the reference point to the audio source based on the audio signals,
determining a video based distance from the reference point to the audio source based on an image of the audio source in one of the frames of video; and
determining the distance based on the audio based distance and the video based distance.

55. A method for validating a detected speaker, comprising the steps of:
detecting audio signals representative of sound from an audio source;
processing the detected audio signals to determine a direction of the audio source;
comparing the processed audio signals with processed previous audio signals that were previously detected in a direction proximate to the direction of the processed audio signals;
determining that the processed audio signals include speech;
generating, at an image pickup device, image signals representative of a framed image obtained in the direction of the processed audio signals and including the detected speaker;
determining movement of the detected speaker based on the framed image and motion pixels; and
if a cross-correlation value between the processed audio signals and the processed previous audio signals is greater than a predetermined threshold value, verifying the detected speaker.

56. The method of claim 55, further including determining from the direction of the processed audio signals and the image signals a location of the verified speaker and storing the location of the verified speaker in a data file.

57. The method of claim 56, wherein a frame of the framed image is selected based on the location of the verified speaker and a framing rule.

58. The method of claim 56, wherein the framing rule includes at least one feature from the group consisting of a dominant verified speaker, a plurality of verified speakers, and absence of a verified speaker.

59. The method of claim 56, further including storing image signals characteristic of the verified speaker in the data file.

60. The method of claim 59, wherein a frame of the framed image is selected based on the location and the characteristic image signals of the verified speaker and a framing rule.

61. The method of claim 60, wherein the framing rule includes at least one feature from the group consisting of a dominant verified speaker, a plurality of verified speakers, and absence of a verified speaker.

62. The system of claim 1 wherein the video face location module further processes the image signals for motion pixels.

63. The method of claim 30 wherein identification of regions or segments in a frame which may contain the object is based on detecting pixels for pixels having flesh tone colors and which represent pixels which have moved.

64. The method of claim 55 wherein detecting movement of the detected speaker with motion pixels includes analyzing a flesh tone binary map for flesh tone colors.

* * * * *